United States Patent
Marugame

(10) Patent No.: US 7,668,401 B2
(45) Date of Patent: Feb. 23, 2010

(54) FORM CHANGING DEVICE, OBJECT ACTION ENCODING DEVICE, AND OBJECT ACTION DECODING DEVICE

(75) Inventor: Atsushi Marugame, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 10/570,560

(22) PCT Filed: Aug. 25, 2004

(86) PCT No.: PCT/JP2004/012181

§ 371 (c)(1),
(2), (4) Date: Jun. 12, 2006

(87) PCT Pub. No.: WO2005/024728

PCT Pub. Date: Mar. 17, 2005

(65) Prior Publication Data

US 2006/0285758 A1    Dec. 21, 2006

(30) Foreign Application Priority Data

Sep. 3, 2003    (JP)    ............... 2003-311072

(51) Int. Cl.
*G06K 9/64*    (2006.01)

(52) U.S. Cl. .............. 382/278; 382/128; 382/209; 382/243

(58) Field of Classification Search ............. 382/128, 382/131, 132, 209, 219
See application file for complete search history.

(56) References Cited

U.S. PATENT DOCUMENTS 6,859,565 B2 *    2/2005    Baron ................ 382/275

(Continued)

FOREIGN PATENT DOCUMENTS

JP    3-74777    3/1991

(Continued)

OTHER PUBLICATIONS

D. Terzopoulos et al., "Analysis and Synthesis of Facial Image Sequences Using Physical and Anatomical Models", IEEE, Trans. PAMI, vol. 15, No. 6, Jun. 1993, pp. 569-579.

(Continued)

*Primary Examiner*—Yosef Kassa
(74) *Attorney, Agent, or Firm*—Scully, Scott, Murphy & Presser, P.C.

(57) ABSTRACT

A shape deformation encoding device includes: a calculation unit for calculating a difference data between a pre-deformation shape data which represents a shape of an object before shape change and a post-deformation shape data which represents a shape of the object after shape change; and a determination unit for determining an action area on which the shape change of the object is arisen and an external force which is acted to the action area for the shape change, based on the pre-deformation shape data and the difference data. The action area includes a plurality of small areas, each of the plurality of small areas includes a plurality of control points, and the external force is calculated as an external force required to deform the plurality of small areas from before to after the shape change independently based on the physical model structure of each of the plurality of small areas. The physical model structure in which the plurality of control points are connected together with springs and dampers are used as a physical model structure.

50 Claims, 29 Drawing Sheets

U.S. PATENT DOCUMENTS

| | | | |
|---|---|---|---|
| 7,006,881 B1 * | 2/2006 | Hoffberg et al. | 700/83 |
| 7,180,074 B1 * | 2/2007 | Crosetto | 250/370.09 |
| 7,239,908 B1 * | 7/2007 | Alexander et al. | 600/427 |

FOREIGN PATENT DOCUMENTS

| | | |
|---|---|---|
| JP | 4-270470 | 9/1992 |
| JP | 6-76044 | 3/1994 |
| JP | 6-76058 | 3/1994 |
| JP | 8-96162 | 4/1996 |
| JP | 8-297751 | 11/1996 |
| JP | 8-305878 | 11/1996 |
| JP | 2002-216161 | 8/2002 |
| JP | 2002-304638 | 10/2002 |
| JP | 2002-329214 | 11/2002 |
| JP | 2003-16475 | 1/2003 |
| JP | 2003-196678 | 7/2003 |
| KR | 2000-0051216 | 8/2000 |

OTHER PUBLICATIONS

P. Ekman, et al., "Facial Action Coding System", (Consulting Psychologist Press, 1997) 1978, pp. 1-316.

S. Choi et al., "Highly Accurate Estimation of the Head Motion and the Facial Action Informations in Knowledge-Based Image Coding", IEICE Technical Report, vol. 90, No. 253, together with English language abstract.

* cited by examiner

| CONTROL POINT NUMBER m | INITIAL 3D COORDINATE $(X_0, Y_0, Z_0)$ | TAG NUMBER i | EXTERNAL FORCE $(f_x, f_y, f_z)$ | END 3D COORDINATE $(X_t, Y_t, Z_t)$ | CONNECTION INFORMATION |
|---|---|---|---|---|---|
| 2001 | 2002 | 2003 | 2004 | 2005 | 2006 |

Fig. 7A
Fig. 7B
3D DATA OF EXPRESSIONLESS FACE
CONTROL POINT a b c
NON-CONTROL POINT p
3D DATA OF EXPRESSIVE ACTION FACE
CONTROL POINT a' b' c'
NON-CONTROL POINT p'
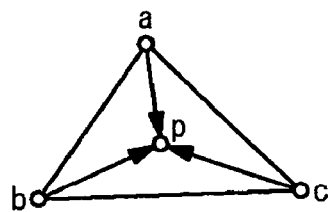
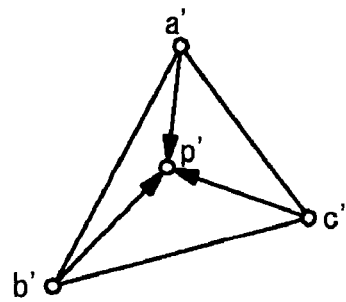
$p = sa + tb + uc$
$0 \leq s, t, u \leq 1$
$s + t + u = 1$
$p' = sa' + tb' + uc'$
$0 \leq s, t, u \leq 1$
$s + t + u = 1$

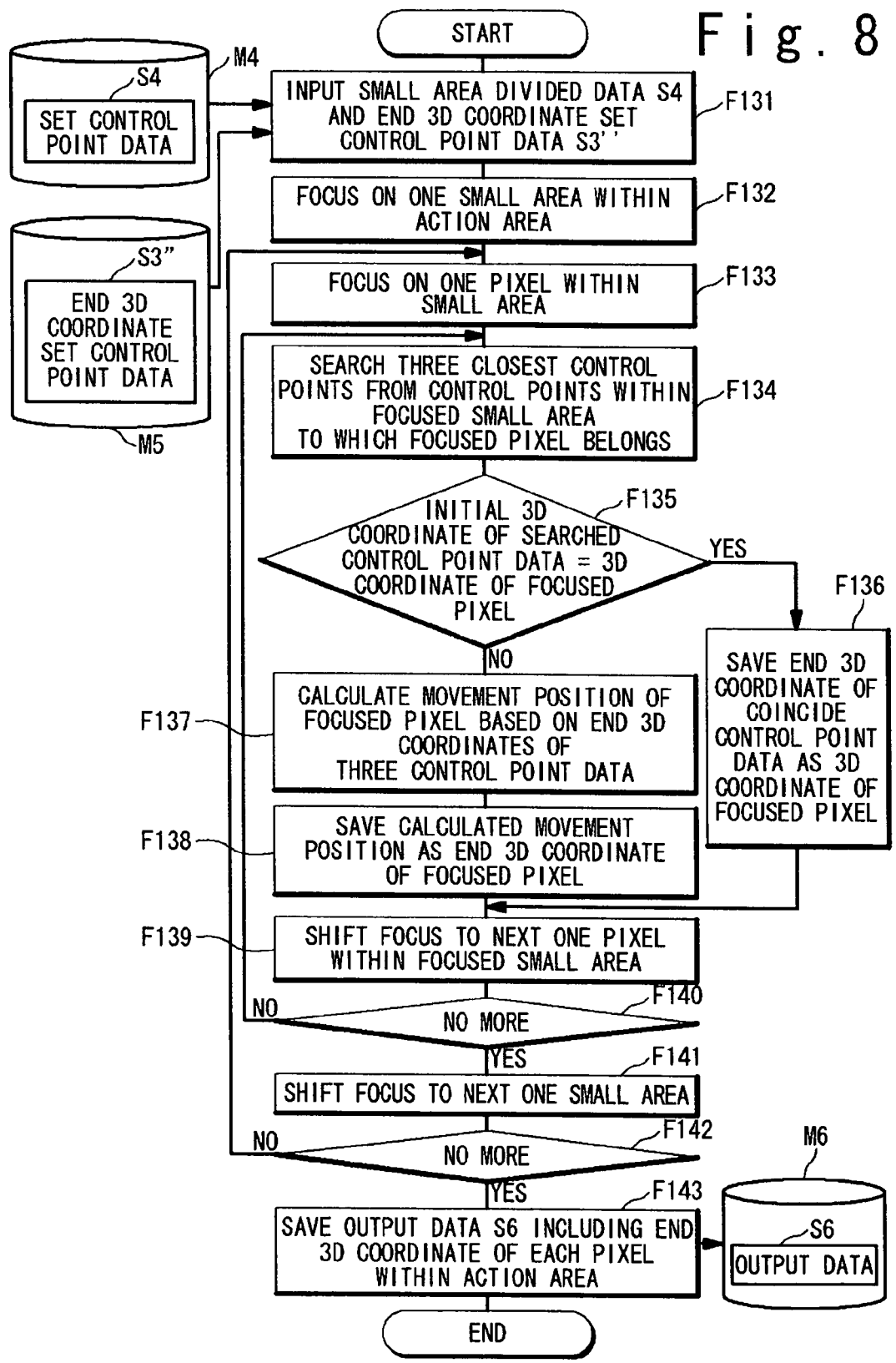

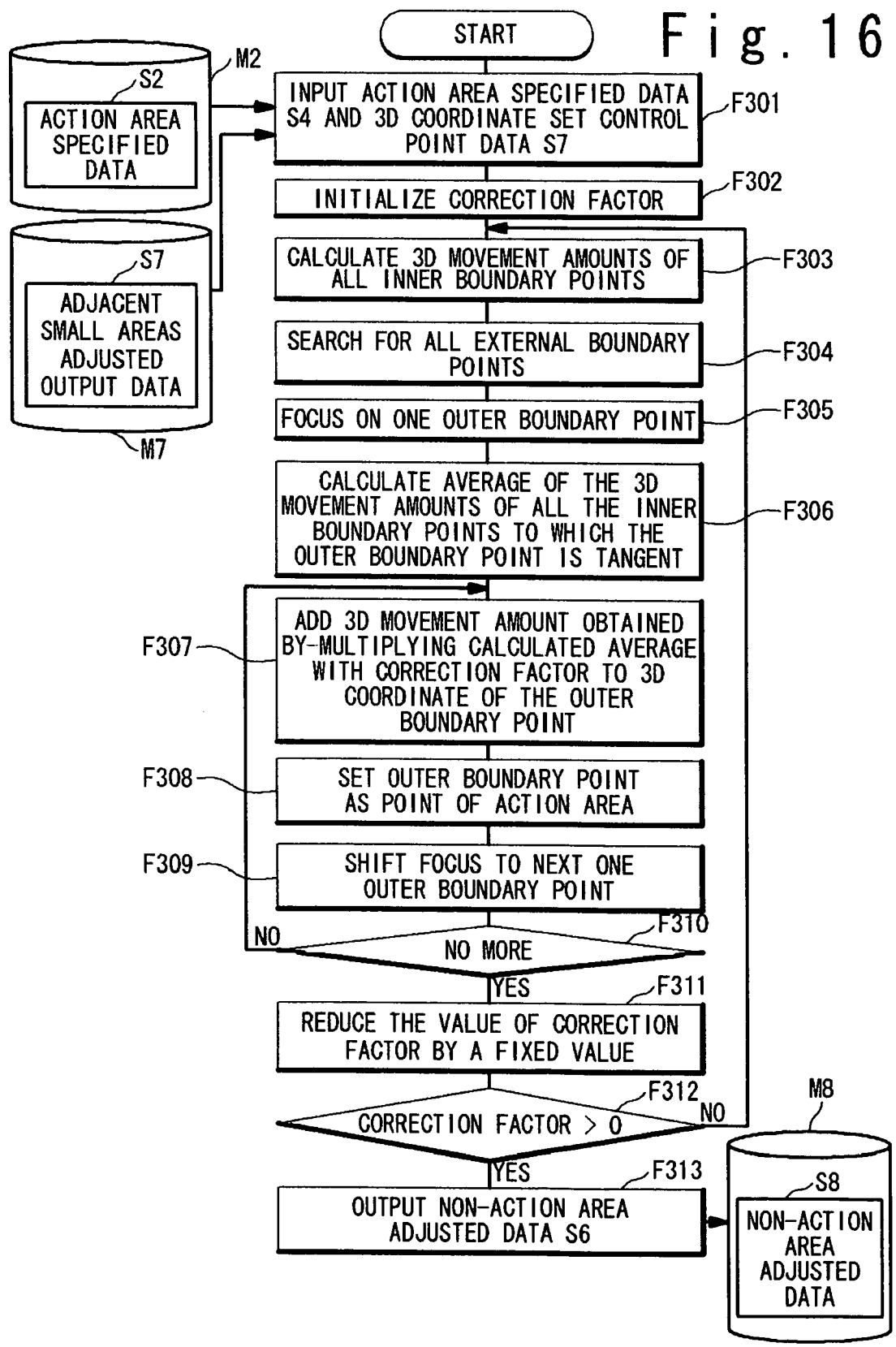

| POLYGON NUMBER | ORIGIN NUMBER | ACTION AREA FLAG | 3D COORDINATE OF EXPRESSIONLESS FACE | 3D COORDINATE OF EXPRESSIVE ACTION FACE |
|---|---|---|---|---|
| ... | ... | ... | ... | ... |
| m | i | ture | $(x_i, y_i, z_i)$ | $(x_i, y_i, z_i)$ |
| ... | ... | ... | ... | ... |

FORM CHANGING DEVICE, OBJECT ACTION ENCODING DEVICE, AND OBJECT ACTION DECODING DEVICE

TECHNICAL FIELD

The present invention relates to a shape deforming device, object action (shape change) encoding device and object action (shape change) decoding device for deforming an object. Especially, the present invention relates to a shape deforming device, object action (shape change) encoding device and object action (shape change) decoding device for providing an expression to a face by deforming a shape of a part of the face.

BACKGROUND ART

In recent years, in the fields of VR (virtual reality) and CG (computer graphics), technologies for deforming a face image has been used for the purpose of providing an expression. For example, by detecting a change in a facial expression of a certain person and then applying the same change to a face image of the same person or a different person, a personified agent is provided which changes an expression in synchronization with a particular person.

There are mainly two trends in such a facial expression synthesis technique. One of them involves a method of treating as a physical model the skin surface moving in conjunction with muscles of facial expression under the skin of the face and solving motion equations based on action of muscles and bones to thereby move a wire frame model corresponding to the skin surface. This kind of conventional technique is described, for example, in "Analysis and Synthesis of Face image Sequences Using Physical and Anatomical Models", (IEEE Trans. PAMI, vol. 15, no. 6. pp. 569-579, June 1993) by D. Terzopoulos K. Waters. The other trend involves a method of subjecting a wire frame model directly to regular geometric deformation to thereby create an expression. This conventional method is described, for example, in Japanese Laid-Open Patent Application (JP-A-Heisei, 8-96162).

On the other hand, a FACS (Facial Action Coding system), as an expression statement method, proposed by a psychologist Ekman et el., is widely used for the study of expression in the fields including the information engineering (see for example, "Facial Action Coding System", (Consulting Psychologist Press, 1977), by P. Elman and W. V. Friesen). The FACS is a method of, based on anatomical insight of facial muscles, comprehensively and objectively stating a facial action in a total of 44 action units (AU) including "Lift up the inner eyebrow", "Draw both ends of the lip horizontally", "Open mouth wide", "Make narrow eyes" and the like; and it is said that all human expressions can be stated with AU combinations. The FACS is, in a typical example, used in combination with a method of subjecting a wire frame model directly to regular geometric deformation to thereby create an expression.

As described above, the facial expression synthesis techniques conventionally includes the method of adopting geometric deformation and the method adopting a physical model. The method of adopting geometric deformation has an advantage that it is capable of performing high-speed processing with relatively small calculation amount since the rules for expressing an expression are only defined by point movement, but suffers from difficulties in reflecting a personal feature on the face model and also inability to provide a natural expression. On the contrary, the method of adopting the physical model is capable of directly expressing the action of muscles of facial expression, and thus is capable of smoothly expressing an expression creation process and also is capable of supporting various face actions by changing the arrangement of muscles of facial expression. However, this method suffers from a problem that the calculation amount becomes huge.

Related to the above mentioned matters, a face image synthesizing device is disclosed in Japanese Laid-Open Patent Application (JP-A-Heisei, 3-74777). In this conventional technique, a movement parameter and an expression parameter based on a human instinctive or unconscious action are added to face image information including an expression parameter and a movement parameter. A face image is synthesized based on the face image information.

Also, device for reproducing and displaying expression code is disclosed in Japanese Laid-Open Patent Application (JP-A-Heisei, 6-76044). This conventional device has an expression occurrence condition input device. An arithmetic processing unit 2 provided with an expression code reproducing means 21 which calculates extents and directions of movement and form changes of mobile parts such as the forehead, eyebrows, and the mouth based on medical analysis of the expression in accordance with the indication signal from the expression occurrence condition input device and reproduces an expression element code. An expression display device which reproduces and displays the form of the face in accordance with the expression element code reproduced by the arithmetic processing unit and moves and deforms the forehead, eyebrows, eyes, the mouth, etc.

Also, an expression encoding device is disclosed in Japanese Laid-Open Patent Application (JP-A-Heisei, 6-76058). In this conventional expression encoding device, a picture input device obtains face picture as a electric signal, and generates a certain face picture data by encoding the face picture. A feature location extraction processing unit receives the face picture data and extracts a feature location picture based on a feature location extraction condition. An expression element extraction processing unit extracts expression elements from the feature location picture based on a related rule between prescribed expression elements and the feature location. An expression element quantization processing unit calculates an expression element code from the expression element information based on a prescribed expression element quantizing rule by performing the expression element quantization processing. A storage unit stores the expression element code. An expression element code output device outputs the expression element code held in the processing device.

Also, a face image generating device is disclosed in Japanese Laid-Open Patent Application (JP-A-Heisei, 8-305878). In this conventional face image generating device, a face image generating unit generates a face image by selecting the parts image forming the respective parts of the face. A face image providing unit provides the change of expression to the face image by executing the image deformation, the movement of displaying position and display/non-display processing for the parts forming the face image in response to the appointed expression.

Also, a device for generating expression animation is disclosed in Japanese Laid-Open Patent Application (JP-P2002-304638A). In this conventional expression animation generating device, an expression difference data extraction part extracts feature points from an expression face sample of an object person, divides the expression face sample into parts according to the feature points, and finds differences of the shape and texture accompanying expression transition variation between two specified different expressions to obtain difference shape data and difference texture. An operation pattern setting part specifies an operation pattern function for prescribing time variation by the parts. A time-series expression image composing process part generates time-series expression shape data and time-series expression textures by specific time intervals according to the operation pattern function, difference shape data, and difference textures. A expression animation generating unit generates a expression animation by continuously displaying the time-series expression image by specific time interval, which is generated by mapping the time-series expression texture to the shape based on the time-series expression shape data.

Also, device for expression composition is disclosed in Japanese Laid-Open Patent Application (JP-P2002-329214A). In this conventional device for expression composition, the computer graphic technique is applied. This composition method includes the steps of: inputting a face expression model as face feature point data; extracting a nearly elliptic sphincter area surrounded with the sphincter of an expression model and prescribing the area above the major axis of the sphincter area as the semi-elliptic area surrounded with the major axis and a semi-elliptic shape; calculating the moving vector at a feature point included in the semi-elliptic area when the expression of a face change; and composing a expression model after expression change by moving the feature point based on the moving vector.

DISCLOSURE OF INVENTION

Thus, it is an object of the invention to eliminate the calculation amount when realizing face expression synthesis and the like by use of a physical model.

According to an aspect of the present invention, a shape deformation encoding device includes a calculation unit configured to calculate a difference data between a pre-deformation shape data which represents a shape of an object before shape change and a post-deformation shape data which represents a shape of an object after shape change; and a determination unit configured to determine an action area on which the shape change of the object is arisen and an external force which is acted to the action area for the shape change, based on the pre-deformation shape data and the difference data. Here, the calculation unit includes: a transformation unit transforming the pre-deformation shape data and the post-deformation shape data into a pre-deformation shape model data and post deformation shape model data; and a difference calculation unit calculating the difference data from a difference between the pre-deformation shape model data and the post-deformation shape model data. The model can be a three-dimensional polygon mesh model, and the pre-deformation shape data and the post-deformation shape data are three-dimensional data the action area includes a plurality of small areas, each of the plurality of small areas includes a plurality of control points, and the external force is calculated as an external force required to deform the plurality of small areas from before to after said shape change independently based on the physical model structure of each of the plurality of small areas. In this case, a physical model structure in which the plurality of control points are connected together with springs and dampers can be adopted as a physical model structure for obtaining the external force. It is preferable that the number of the plurality of control points and the physical model structure are same for all the plurality of small areas. The object may include a human face. In that case, the shape of an object before shape change represents an expressionless status of a face, and the shape of an object after shape change represents an expressive status of a face.

Also, according to an another aspect of the present invention, a shape deformation decoding device includes: a decoding unit configured to determine a movement position of a control point within an action area based on a pre-deformation shape data representing a shape of an object before shape change and information of an external force acted to said action area correlated with a shape change; and a shape generation unit configured to generate a post-deformation shape data which represents a shape of the object after the shape change from the pre-deformation shape data and a movement position of each of the plurality of control points. The action area includes a plurality of small areas, and a movement position of the action point of each of the plurality of small areas is determined by using a physical model by a unit of the plurality of small areas.

Here, the pre-deformation shape data can be three-dimensional data. In that case, the decoding unit includes: a model data generation unit generating pre-deformation shape model data based on a three-dimensional model of a shape of the object before said shape change and the pre-deformation shape data; and a movement amount calculation unit determining a movement position of each of control points within the action area from the pre-deformation shape model data based on the information of an external force. Instead, when the pre-deformation shape data is three-dimensional data, the decoding unit may includes a mesh model data generation unit generating a pre-deformation shape mesh model data based on a three dimensional polygon mesh model and the pre-deformation shape data; and a movement amount calculation unit deciding a movement position of each of control points within the action area from the pre-deformation shape mesh model data based on the information of an external force.

Also, it is preferable that an action interpolation unit is included, which calculates a movement position of non-control point which is not the control point from a movement point of the control point adjacent to the non-control point for each of the plurality of small areas. The shape generation unit generates a shape of the object after the shape change by a unit of the plurality of small areas from the pre-deformation shape data and a movement position of each of the plurality of control points. In this case, an adjacent small areas adjustment unit can be further included, which is configured to smooth a discontinuous portion occurring at a boundary part of adjacent ones of the plurality of small areas after the shape change. Also, a non-action area adjustment unit can be further included, which is configured to smooth a discontinuous portion occurring at a boundary part between the action area and a surrounding non-action area after the shape change.

Here, the plurality of control points are connected by a spring and a damper in a physical model of each of the plurality of small areas. The object may include a human face, wherein the shape before shape change represents an expressionless face, and the shape after shape change represents an expressive face. A three-dimensional actuator group may be included, which drives the action area of the object having flexibility based on the post-deformation shape data.

Also, according to the another aspect of the present invention, the shape deformation encoding-decoding device includes: any of the above mentioned shape deformation encoding devices; the shape deformation decoding device according to any of claims 8 to 17; and a transmission device configured to transmit the action area generated by the shape deformation encoding device and the information of an external force to the shape deformation decoding device through a communication path.

Also, according to the another aspect of the present invention, a shape deformation encoding method is achieved by the steps of: calculating a difference data between a pre-deformation shape data which represents a shape of an object before shape change and a post-deformation shape data which represents a shape of an object after shape change; and determining an action area on which the shape change of the object is arisen and an external force which is acted to the action area for the shape change, based on the pre-deformation shape data and the difference data.

Here, the calculating step may includes the steps of: transforming the pre-deformation shape data and the post-deformation shape data into a pre-deformation shape model data and post-deformation shape model data; and calculating the difference data from a difference between the pre-deformation shape model data and the post-deformation shape model data. The model may be a three-dimensional polygon mesh model, and the pre-deformation shape data and the post-deformation shape data may be three-dimensional data. The action area may include a plurality of small areas, each of the plurality of small areas includes a plurality of control points, and the external force is calculated as an external force required to deform the plurality of small areas from before to after the shape change independently based on a physical model structure of each of the plurality of small areas. It is preferable that a physical model structure in which the plurality of control points are connected together with springs and dampers are used as the physical model structure for obtaining the external force. It is further preferable that a number of the plurality of control points and the physical model structure are same for all the plurality of small areas. The object includes a human face, the shape of an object before shape change represents an expressionless status of a face, and the shape of an object after shape change represents an expressive status of a face.

According to the another aspect of the present invention, the shape deformation decoding method includes the steps of: determining a movement position of a control point within an action area based on a pre-deformation shape data representing a shape of an object before shape change and information of an external force acted to the action area correlated with a shape change; and generating a post-deformation shape data which represents a shape of the object after the shape change from the pre-deformation shape data and a movement position of each of the plurality of control points. The action area includes a plurality of small areas, and a movement position of the action point of each of the plurality of small areas is determined by using a physical model by a unit of the plurality of small areas.

Here, the pre-deformation shape data is three-dimensional data, and the step of determining a movement position can be achieved by the steps of: generating pre-deformation shape model data based on a three-dimensional model of a shape of the object before the shape change and the pre-deformation shape data; and determining a movement position of each of control points within the action area from the pre-deformation shape model data based on the information of an external force. Instead, the following configuration can be adopted: the pre-deformation shape data is three-dimensional data, and the step of determining a movement position is achieved by the steps of: generating a pre-deformation shape mesh model data based on a three dimensional polygon mesh model and the pre-deformation shape data; and deciding a movement position of each of control points within the action area from the pre-deformation shape mesh model data based on the information of an external force.

The step of calculation may be included, calculating a movement position of non-control point which is not the control point from a movement point of the control point adjacent to the non-control point for each of the plurality of small areas. In this case, the step of generating a post-deformation shape data generates a shape of the object after the shape change by a unit of the plurality of small areas from the pre-deformation shape data and a movement position of each of the plurality of control points. Also, the smoothing step may be included, which smoothes a discontinuous portion occurring at a boundary part of adjacent ones of the plurality of small areas after the shape change, and the smoothing step may be included, which smoothes a discontinuous portion occurring at a boundary part between the action area and a surrounding non-action area after the shape change.

It is preferable that the plurality of control points are connected by a spring and a damper in a physical model of each of the plurality of small areas, and the object may include a human face, the shape before shape change represents an expressionless face, and the shape after shape change represents an expressive face. Further, the object may be a robot, and the method further includes the step of: driving the action area of the object having flexibility based on the post-deformation shape data.

According to the another aspect of the present invention, a shape deformation encoding-decoding method includes: generating information of an action area and information of an external force by any of the above mentioned shape deformation encoding method; transmitting the information of an action and the information of an external force through a communication path; and generating post-deformation shape data representing a shape of the object from the transmitted information of an action area and the transmitted information of an external force by any of the above mentioned method.

Further, according to an another aspect of the present invention, the present invention relates to a computer-readable software product for realizing any of the above mentioned shape deformation encoding method and the above mentioned shape deformation decoding method.

According to the present invention, the calculation amount in realizing facial expression synthesis and the like with a physical model can be reduced. In a conventional method in which facial expression synthesis is performed with a physical model such as a spring model or the like, assuming an entire area disposed at muscles of facial expression as one area, the movement position of each point included in this area is calculated based on an external force, which requires a vast calculation amount. In the present invention, however, the movement position of each control point is independently calculated in smaller units, i.e., in units of small areas. Moreover, the target of the calculation of the movement position in accordance with the external force is limited to a control point that is part of points belonging to the small area, and for the rest of points, i.e., for a non-control point, calculation is made by interpolation or the like based on the movement position of the control point near this non-control point.

Also, a step difference or the like which tends to occur at a boundary portion between small areas when an action area is divided into a plurality of small areas and when the movement position is independently calculated in units of small areas can be made less outstanding. And a step difference or the like occurring at a boundary portion between the action area and a non-action area therearound can be made less outstanding. Also, a physical model structure in which control points are coupled together with springs and dampers is used as a physical model structure of small areas, thereby permitting reproduction of an action close to an action made by muscles of facial expression. In this case, the same number of control points and the same physical model structure are provided for all small areas, thereby permitting reducing the number of parameters used in calculating the movement position of the control point and also permitting further reducing the calculation amount. When the object model includes a human face model, and shape change with time includes a change in human facial expression, synthesis of human facial expressions can be achieved.

Also, according to the present invention, an area that changes with object shape change with time, i.e., the action area, and an external force added to each control point included in this action area can be calculated in a small calculation amount. In a conventional method in which facial expression synthesis is performed with the physical model such as the spring model or the like, assuming an entire area at which the muscles of facial expression are disposed as one area, the external force is calculated based on the movement position of all points included in this area, which requires a vast calculation amount. In the present invention, however, the movement position of each control point is independently calculated in smaller units, i.e., in units of small areas. A physical model structure in which control points are coupled together with springs and dampers is used as the physical model structure of small areas, thereby permitting reproduction of an action close to an action made by muscles of facial expression. The same number of control points and the same physical model structure are provided for all small areas, thereby permitting further reducing the calculation amount required for external force calculation and also permitting reducing the number of parameters required. When an object includes a human face which is in an expressionless state before shape change and is in a state displaying some kind of expression after the shape changes, calculation of the external force required for changing the human face from an expressionless face to an expressive face can be executed.

Also, three-dimensional data obtained by deforming three-dimensional data of the object based on external force information can be generated in the small calculation amount. The reasons are as follows. In the conventional method in which facial expression synthesis is performed with the physical model such as the spring model or the like, assuming an entire area at which muscles of facial expression are disposed as one area, the movement position of each point included in this area is calculated based on the external force, which requires a vast calculation amount. In the present invention, however, the movement position of each control point is independently calculated in smaller units, i.e., in units of small areas. An image obtained by deforming an object based on the external force information can be generated in a small calculation amount. The reasons are as follows. In the conventional method in which facial expression synthesis is performed with the physical model such as the spring model or the like, assuming an entire area where muscles of facial expression are disposed as one area, the movement position of each point included in this area is calculated based on the external force, which requires a vast calculation amount. In the present invention, however, the movement position of each control point is independently calculated in smaller units, i.e., in units of small areas. The movement amount of each control point after shape change correlated with three-dimensional data or an image before the shape change can be calculated based on a plurality of external force information, for example, external information for "Open the mouth wide" and external information for "Lift up the upper eyelid". A step difference or the like, which tends to occur at a boundary portion between small areas when the action area is divided into the plurality of small areas and when the movement position is calculated independently in units of small areas, can be made less outstanding. A step difference or the like occurring at boundary portion between the action area and a non-action area therearound can be made less outstanding. A physical model structure in which the control points are coupled together with the springs and dampers is employed as the physical model structure of small areas, thereby permitting reproduction of the action close to the action made by muscles of facial expression. The object includes the human face which is in an expressionless state before shape change and is in a state displaying some kind of expression after the shape change, thereby permitting providing an expressionless face with some kind of expression.

According to the present invention, by detecting a change in facial expression of a certain person and providing the same change to a face image of the same person or a different person, an anthropomorphic agent which changes expression in synchronization with a particular person can be achieved in small calculation amount. The reasons are as follows. In the conventional method in which facial expression synthesis is performed with the physical model such as the spring model or the like, assuming an entire area where muscles of facial expression are disposed as one area, the movement position of each point included in this area is calculated based on the external force, which requires the vast calculation amount. In the present invention, however, the movement position of each control point is independently calculated in smaller units, i.e., in units of small areas. Moreover, in a conventional method in which facial expression synthesis is performed with the physical model such as the spring model or the like, assuming an entire area where muscles of facial expression are disposed as one area, the movement position of each point included in this area is calculated based on the external force, which requires the vast calculation amount. In the present invention, however, the movement position of each control point is independently calculated in smaller units, i.e., in units of small areas. The expression is displayed on an object such as a mask fitted to the head of the robot, thereby permitting reducing the calculation amount. The reasons are as follows. In the conventional method in which facial expression synthesis is performed with the physical model such as the spring model or the like, assuming the entire area where muscles of facial expression are disposed as one area, the movement position of each point included in this area is calculated based on the external force, which requires vast calculation amount. In the present invention, however, the movement position of each control point is independently calculated in smaller units, i.e., in units of small areas.

BRIEF DESCRIPTION OF THE DRAWINGS

FIG. 7A is an explanatory diagram of an operation performed by action interpolation unit in the shape deforming device according to the first embodiment of the present invention;

FIG. 7B is an explanatory diagram of an operation performed by action interpolation unit in the shape deforming device according to the first embodiment of the present invention;

FIG. 8 is a flowchart showing an example of processing performed by the action interpolation unit in the shape deforming device according to the first embodiment of the present invention;

FIG. 16 is a flowchart showing an example of smoothing processing performed by non-action area adjustment unit in the shape deforming device according to the third embodiment of the present invention;

FIG. 21 is a diagram showing an example of the contents of three-dimensional difference data generated by the three-dimensional difference calculation unit in the facial action encoding device according to the fourth embodiment of the present invention;

BEST MODE FOR CARRYING OUT THE INVENTION

Figure 1:
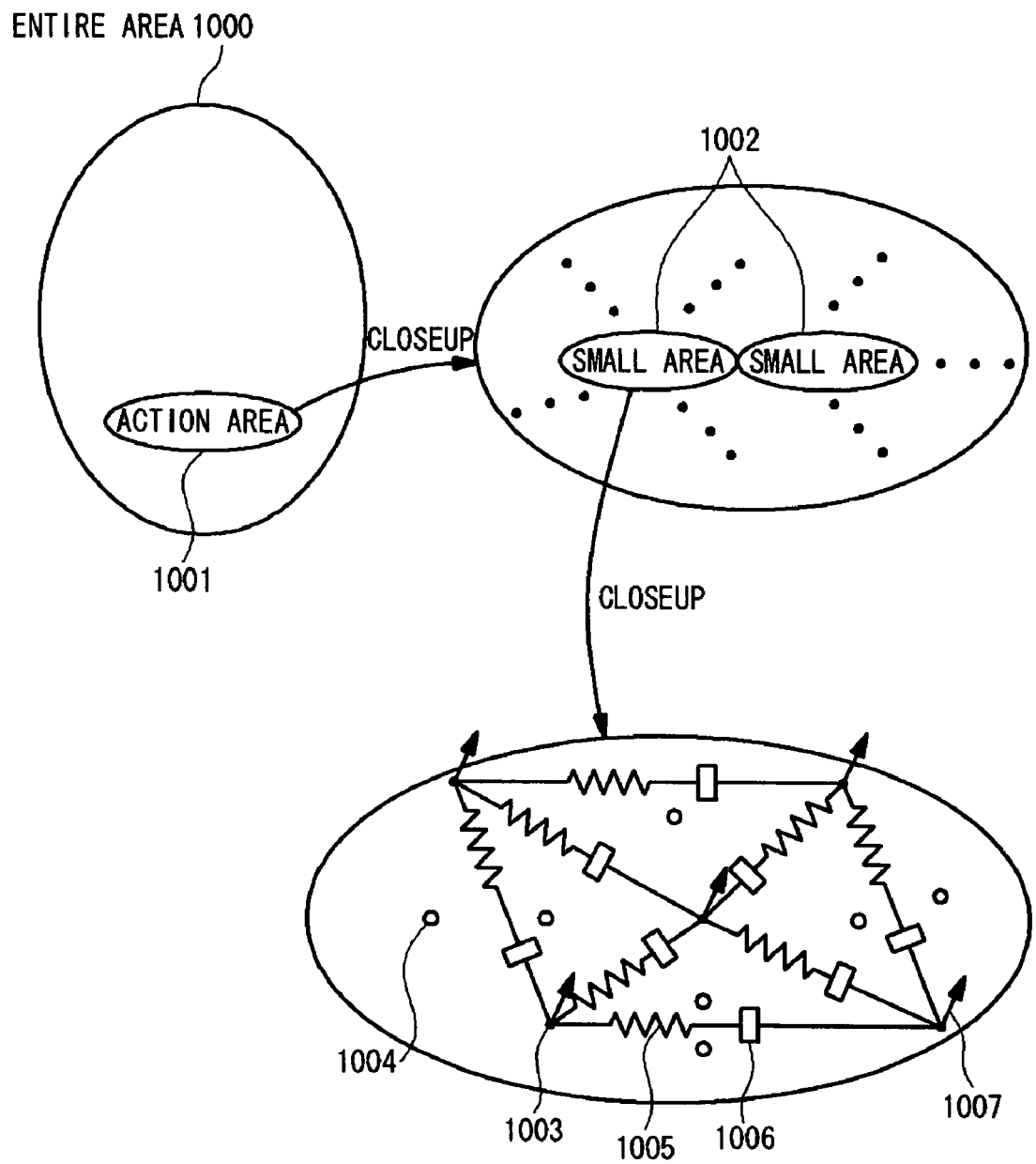
FIG. 1 is an explanatory diagram of the principles of the present invention.

First, the basic principles of the present invention will be described in detail referring to the drawings.

Referring to FIG. 1, in one example of the face model used in the present invention, at least one action area 1001 is set on an entire face area 1000. The action area 1001 is an area subjected to deformation and is defined in correspondence with an expression to be displayed. For example, for each AU in the FACS, a portion provided with muscles of expression that generates this AU is defined as one action area. An area found to be different in comparison between an expressionless face and a certain expressive action face may be defined as the action area.

In the present invention, such an action area 1001 is divided into a plurality of small areas 1002, and the movement amount in accordance with the external force is calculated for individual small areas 1002. Points (pixels) belonging to one small area 1002 are divided into a plurality of (three or more) control points 1003 indicated by black circles and non-control points 1004, other than the control points, indicated by white circles. The control points 1003 are connected together with springs 1005 and dampers 1006. The external force is applied only to the control points 1003 as shown by arrows 1007 of FIG. 1. In the calculation of the individual small area 1002, the movement amount of each control point 1003 belonging to this small area 1002 is calculated based on the external force added to this control point 1003 and constants of the spring 1005 and the damper 1006 while the movement amount of the non-control point 1004, other than the control points 1003, is calculated by interpolation or the like based on the movement amounts of a plurality of control points 1003 near the non-control point 1004. As a result, the entire individual small area 1002 moves integrally by the external force acting on the control points 1003 provided therein, and all the small areas 1002 move in the same manner. As a result, the action area 1001 becomes deformed, thus permitting display of a desired expression.

In this manner, an Action Unit is reproduced by using the model in which the action area 1001 is divided into the small areas 1002 that integrally move while interacting as the spring model, the external force 1007 acts only on the plurality of control points 1003 connected together with the springs 1005 and the dampers 1006 in each small area 1002, and the entire small area 1002 moves by being dragged by the control points 1003 on which this external force 1007 acts. The expression of the Action Unit in this model is represented by spring model calculation not in the unit of action area 1001 but in the unit of small area 1002. This makes parameter setting easier and also reduce the calculation amount. Since the external force calculation is made instead of directly handling the movement amount, it provides advantages such as that the individuality at the time of expression and the universality in expressive action can be separated from each other.

Next, will be described a detailed method for calculating the movement position of the control point 1003 in one small area 1002. Referring to, as one example, a case where all the constants of the spring 1005 and the damper 1006 are equal, the method of calculating the movement position will be descried. Such a case can be formulated as described below. That is, assuming that n number ($\geq 3$) of control points exist within one small area, the mass of the i-th control point is $M_i$, the external force acting thereon is $f_i$, and the constants of the spring and the damper connecting the i-th and j-th control points are $K_{ij}$ and $D_{ij}$, respectively. In this condition, a position xi of the i-th control point is represented by formula (1) below where the reference position of the spring is 1i:

[Equation 1]

$$M_i \ddot{x}_i = -\sum_{j \neq i} D_{ij}(\dot{x}_i - \dot{x}_j) - \sum_{j \neq i} K_{ij}(x_i - x_j) + F_i \quad (1)$$

where

[Equation 2]

$$F_i = f_i + \sum_{j \neq i} K_{ij}(l_i - l_j)$$

Now replacing with:

$$x = (x_1, \dot{x}_1, \ldots, x_n, \dot{x}_n)^T, u = (F_1, \ldots, F_N)^T \quad \text{[Equation 3]}$$

the formula (1) can also be rewritten with a standard formula of a linear control system represented by:

[Equation 4]

$$\frac{d}{dt} x = Ax + Bu \quad (2)$$

where A and B are 2n×2n and 2n×n matrixes, respectively, as represented below.

[Equation 5]

$$A = \begin{bmatrix} 0 & 1 & \cdots & 0 & 0 & \cdots & 0 & 0 \\ -\sum_{j \neq 1} k_{ij} & -\sum_{j \neq 1} d_{ij} & \cdots & k_{1j} & d_{1j} & \cdots & k_{1n} & d_{1n} \\ \vdots & \vdots & \vdots & \vdots & \vdots & \vdots & \vdots & \vdots \\ 0 & 0 & \cdots & 0 & 1 & \cdots & 0 & 0 \\ k_{i1} & d_{i1} & \cdots & -\sum_{j \neq i} k_{ij} & \sum_{j \neq i} d_{ij} & \cdots & k_{in} & d_{in} \\ \vdots & \vdots & \vdots & \vdots & \vdots & \vdots & \vdots & \vdots \\ 0 & 0 & \cdots & 0 & 0 & \cdots & 0 & 1 \\ k_{n1} & d_{n1} & \cdots & k_{nj} & d_{nj} & \cdots & -\sum_{j \neq n} k_{nj} & -\sum_{j \neq n} d_{nj} \end{bmatrix} \quad (3)$$

where $k_{ij} = K_{ij}/M_i$ and $d_{ij} = D_{ij}/M_i$, and

[Equation 6]

$$B = \begin{bmatrix} 0 & \cdots & 0 \\ m_1 & \cdots & 0 \\ \vdots & \cdots & \vdots \\ 0 & \cdots & 0 \\ 0 & \cdots & m_n \end{bmatrix} \quad (4)$$

where $m_i = 1/M_i$.

The analytic solution for the above formula (3) is represented by the following formula (5):

[Equation 7]

$$x(t) = e^{At} x(0) + \int_0^t e^{A(t-\tau)} Bu(\tau) d\tau \quad (5)$$

where

[Equation 8]

$$e^{At} = 1 + At + \ldots + \frac{t^{n-1}}{(n-1)!}A^{n-1} + \ldots \quad (6)$$

This solution of the equation (5) may not exist corresponding to A and B, or, even when it exists, it may diverge with t infinity. However, in the model of the present invention, when u is fixed, the mass $M_i$, the spring coefficient $K_{ij}$, and the damper constant $D_{ij}$ are fixed, that is, when $m_i k_i d_i$ is fixed values m, k, and d, for the exponential function matrixes $e^{At}$ at a mass point number n are, with P(t) and Q(t) at the 2×2 matrix, the elements can be respectively represented by:

$$P_{11}(t) = \frac{1}{n} + e^{-\frac{nd}{2}t}\left(\frac{n-1}{n}\cosh\lambda_n t + \frac{(n-1)d}{2\lambda_n}\sinh\lambda_n t\right) \quad \text{[Equation 9]}$$

$$P_{12}(t)\frac{t}{n} + e^{-\frac{nd}{2}t}\left(\frac{(n-1)}{n\lambda_n}\sinh\lambda_n t\right) \quad \text{[Equation 10]}$$

$$P_{21}(t) = -e^{-\frac{nd}{2}t}\left(\frac{(n-1)k}{\lambda_n}\sinh\lambda_n t\right) \quad \text{[Equation 11]}$$

$$P_{22}(t) = \frac{1}{n} + e^{-\frac{nd}{2}t}\left(\frac{n-1}{n}\cosh\lambda_n t - \frac{(n-1)d}{2\lambda_n}\sinh\lambda_n t\right) \quad \text{[Equation 12]}$$

$$Q_{11}(t) = \frac{1}{n} - e^{-\frac{nd}{2}t}\left(\frac{1}{n}\cosh\lambda_n t + \frac{d}{2\lambda_n}\sinh\lambda_n t\right) \quad \text{[Equation 13]}$$

$$Q_{12}(t) = \frac{t}{n} - e^{-\frac{nd}{2}t}\left(\frac{1}{n\lambda_n}\sinh\lambda_n t\right) \quad \text{[Equation 14]}$$

$$Q_{21}(t) = e^{-\frac{nd}{2}t}\left(\frac{k}{\lambda_n}\sinh\lambda_n t\right) \quad \text{[Equation 15]}$$

$$Q_{22}(t) = \frac{1}{n} - e^{-\frac{nd}{2}t}\left(\frac{1}{n}\cosh\lambda_n t - \frac{d}{2\lambda_n}\sinh\lambda_n t\right) \quad \text{[Equation 16]}$$

Note that

[Equation 17]

$$\lambda_n = \sqrt{\frac{n^2 d^2}{4} - nk}$$

In this condition, the matrix of equation 8 can be represented by:

[Equation 18]

$$e^{At} = \begin{bmatrix} P(t) & Q(t) & Q(t) & \cdots & \cdots \\ Q(t) & P(t) & Q(t) & \cdots & \cdots \\ \cdots Q(t) & Q(t) & P(t) & \cdots & \cdots \\ \cdots & \cdots & \cdots & \ddots & \cdots \\ \cdots & \cdots & \cdots & \cdots & \ddots \end{bmatrix} \quad (7)$$

The real part of system characteristic values $-nd/2+\lambda_n$ and $-nd/2-\lambda_n$ is always negative; therefore, divergence at t infinity dose not occur. Therefore, where t and the parameters m, k, d are provided and u is fixed, formula (5) becomes a linear expression of x(t), x(0), and u. Note that since m and u always appear in the form of the product of the two and thus cannot be separated from each other, they can be treated as one constant (they are integrated into u). In this manner, when t is provided, the parameters are k and d only.

The parameters k and d can be provided in any manner, wherein depending on whether the value within the root sign is positive, 0, or negative, behaviors, overdamping, critical damping, and damping oscillation are respectively performed. In any case of these three kinds of behaviors (detailed descriptions are given in Document "Dynamics On the new viewpoints", written by D. Burger and M. G. Olson, translated by Toda and Tagami, Baifuukan, 1975), damping is performed toward the t infinitely great, but only in the damping oscillation, damping is performed while periodically repeating increase and decrease. In the critical oscillation, converging is faster than overdamping. Hereinafter, the embodiment will be described, referring to the critical damping which makes fast action without periodical increase and decrease.

Condition initial speed 0 corresponding to the boundary condition for parameter t, k, and d and (2):

$$\dot{x}_i(0) = 0 \quad \text{[Equation 19]}$$

is provided, the formula (5) is represented by formula (8) below:

[Equation 20]

$$x_i(t) = P_{11}(t)x_i(0) + Q_{11}(t)\sum_{j \neq i} x_j(0) + \int_0^t \left(P_{12}(t-\tau)F_i + Q_{12}(t-\tau)\sum_{j \neq i} F_j\right)d\tau \quad (8)$$

and becomes a linear expression of external force $F_i$, a movement position xi(t) can be easily calculated by formula (8). Note that the speed at time t can be represented by formula (9) below:

[Equation 21]

$$\dot{x}_i(t) = P_{21}(t)x_i(0) + Q_{21}(t)\sum_{j \neq i} x_j(0) + \int_0^t \left(P_{22}(t-\tau)F_i + Q_{22}(t-\tau)\sum_{j \neq i} F_j\right)d\tau \quad (9)$$

The time t when formulae below each become 0 is converging time.

$$\dot{x}_0(t) \quad \text{[Equation 22]}$$

$$\dot{x}_1(t) \quad \text{[Equation 23]}$$

$$\dot{x}_2(t) \quad \text{[Equation 24]}$$

In the present invention, the action area 1001 as shown in FIG. 1 is divided into the plurality of small areas 1002, and the movement amount of each control point 1003 in accordance with the external force 1007 is calculated in the unit of the individual small area 1002. Therefore, in the present invention, to calculate the external force 1007 from the movement amount of each control point 1003, the external force 1007 is calculated from the movement amount of the each control point 1003 in the unit of the individual small area 1002. The aforementioned formula (8) can also be employed for the calculation of this external force.

In the description above, the physical model is employed with the structure in which the control points 1003 of the small area 1002 are connected together with the springs 1005 and the dampers 1006. As a more simple structure, however, a physical model that is simply proportional to the external force, a gravity model that is inversely proportional to the square of distance form a particular point such as the gravity of one of the control points or the small area, or the like, or other types of physical models such as an electromagnetic model can be employed. In that case, the movement amount of the control point 1003 within the small area 1002 can be calculated by solving corresponding equations.

Figure 2:
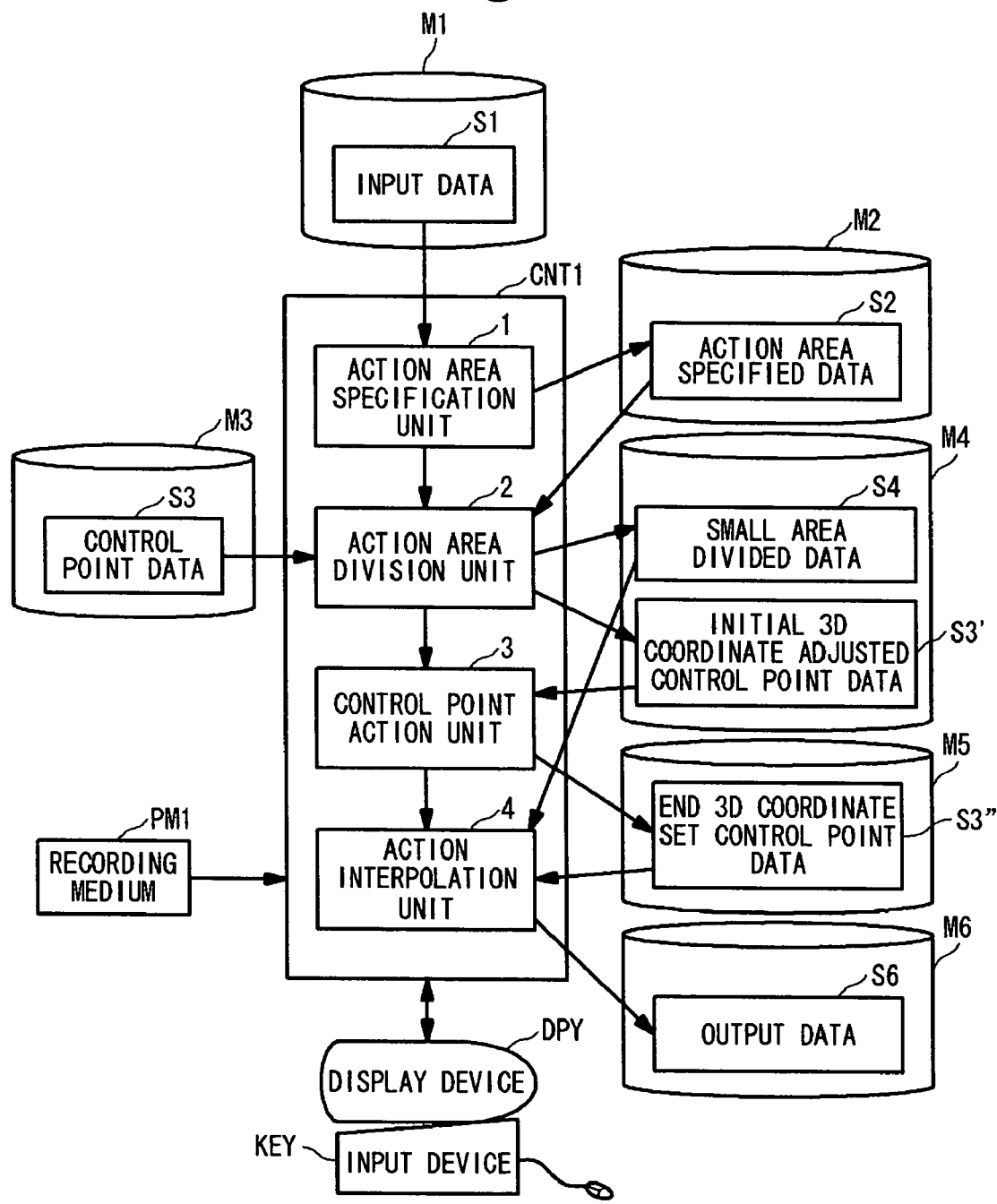
FIG. 2 is a block diagram of a shape deforming device according to a first embodiment of the present invention.

FIG. 2 is a block diagram showing the configuration of the shape deforming device of the first embodiment of the present invention. The shape deforming device deforms a human expressionless face image into an expressive action face image. The shape deforming device of this embodiment is composed of: a processor CNT 1, storage devices M1 to M6, a display device DPY, and an input device KEY. A plurality of storage devices M1 to M6 are each composed of, for example, a magnetic disc. Of these devices, the storage device M1 stores the input data S1 concerning the human expressionless face. The storage device M6 stores the output data S6 concerning the human expressive action face. The other storage devices M2 to M5 store the control data or the interim results required in the course of processing. The display device DPY is, for example, a liquid crystal display, and is used for displaying an expressive action face image obtained as the output data S6 or for displaying data in the course of processing. The input device KEY is composed of, for example, a keyboard and a mouse, and is used for accepting various kinds of data and directions provided from the user. The controller CNT1 is composed of, for example, a central processor of a computer, and executes main processing performed by the shape deforming device of this embodiment. The controller CNT1 has an action area specification unit 1, an action area division unit 2, a control point action unit 3, and an action interpolation unit 4.

Function units 1 to 4 of the controller CNT1 can be achieved by the computer composing the controller CNT1 and a program for the shape deforming device. The program for the shape deforming device is recorded on a computer-readable recording medium PM1 such as the magnetic disc or the like, and is read by the computer at times such as computer start-up and the like and achieves the function units 1 to 4 on the computer by controlling the operation of the computer.

Next, an operation performed by the shape deforming device according to this embodiment of the present invention will be described. The controller CNT1 inputs and processes the input data S1 stored in the storage device M1, and finally outputs the output data S6 to the storage device M6 and also control the display device DPY to display the output data S6. In this process, the controller CNT loads and uses control point data S3 stored in the storage device M3 to appropriately save action area specified data S2, small area divided data S4 and initial 3D coordinate adjusted control point data S3', and end 3D coordinate set control point data S3" into the storage devices M2, M4 and M5, respectively. Hereinafter, a detailed description will be given.

First, the action area specification unit 1 of the controller CNT1 will be described. The action area specification unit 1 inputs the input data S1 from the storage device M1, and prompts the user to specify a desired area of this input data S1 as the action area. Here, the desired area to be specified as the action area is previously defined in correspondence with an expression to be displayed. In this embodiment, for each Action Unit in the FACS, a portion provided with muscles of facial expression to generate the Action Unit is specified as the action area. For example, the AU No. 27 in the FACS has the content including "Open the mouth wide". To achieve the action of this AU, an area including the mouth is to be specified as the action area. In this case, for subsequent search of the control point data S3, the user is prompted to input the number (No.) of this Action Unit from the input device KEY, so that this No. is saved into the controller CNT1.

Information on the action area specified by the action area specification unit 1 is added to an image or three-dimensional data of the input data S1, and is saved into the storage device M2 as action area specified data S2. For example, when an input image is a color image of RGB, a possible method is to save the image as RGBα obtained by adding α of 1 bit to each image and then set, as the value of α, 1 for the action area and 0 for other areas. Similarly, in the case of three-dimensional data, it is saved in the form of (x, y, z, α). For a specification method, a possible method is, for example, to display an image or three-dimensional data with a tool employing a GUI and then specifying the action area with a mouse or a tablet.

Figure 3:
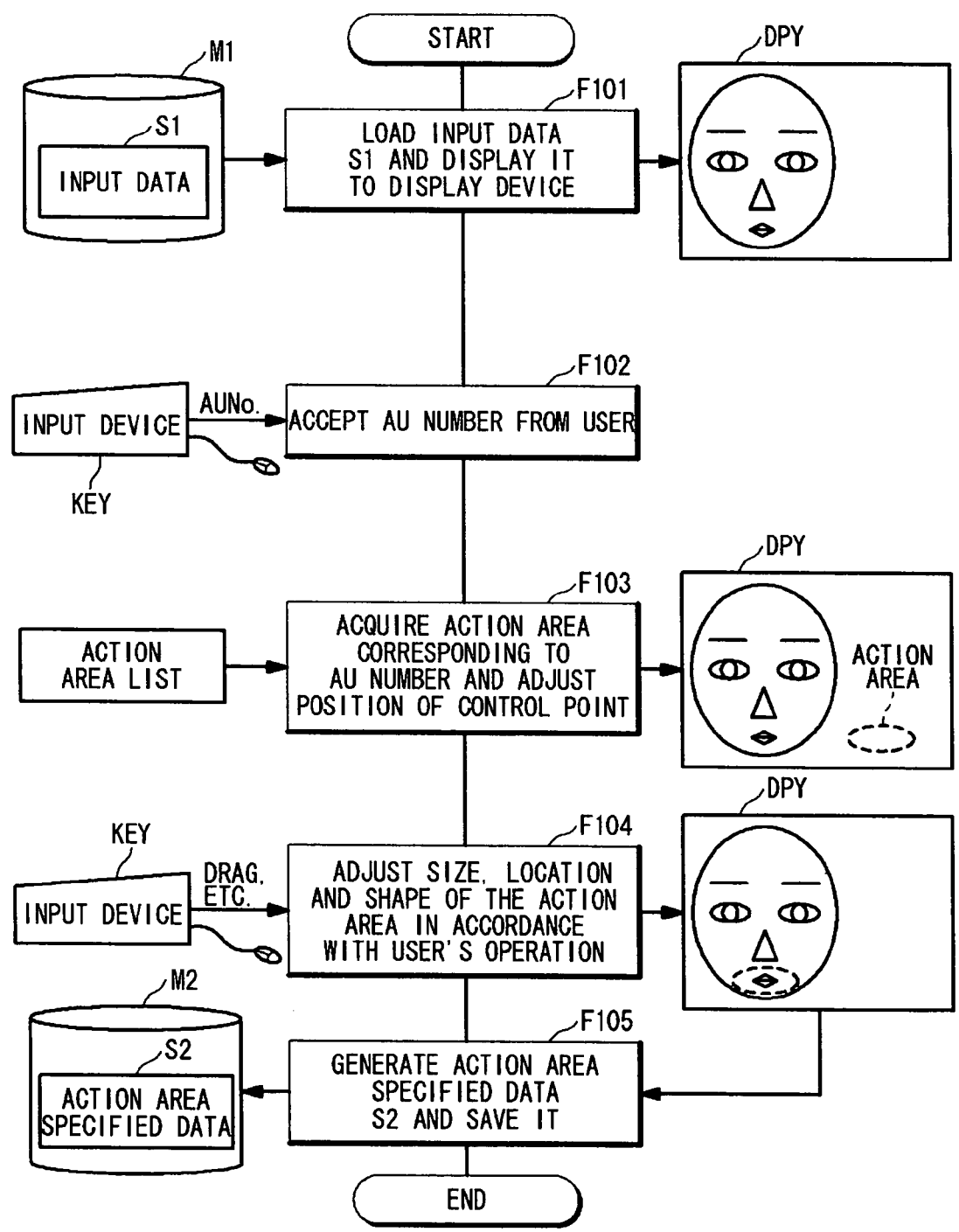
FIG. 3 is a flowchart showing an example of processing performed by action area specification unit in the shape deforming device according to the first embodiment of the present invention.

A detailed example of the action area specification unit 1 will be described referring to FIG. 3. First, the action area specification unit 1 loads an expressionless face image of a certain person as the input data S1 from the storage device M1, and then displays it on the screen of the display device DPY (step F101). Next, the action area specification unit 1 accepts the Action Unit number in the FACS from the user (step F102). The action area specification unit 1 has, for each Action Unit number in the FACS, a list of typical action areas indicating facial areas provided with muscles of facial expression to generate this Action Unit, and thus acquires from the list the action area corresponding to the Action Unit number inputted from the user and displays it on the display device DPY (step F103). In FIG. 3, the action area is displayed by a broken line. Next, the action area specification unit 1 moves the display location of the action area and adjusts the size and shape of the action area in accordance with the user's mouse dragging operation or the like (step F104). In the figure, assuming the Action Unit No. 27 in the FACS, the action area is adjusted to be located at an appropriate range including the mouth. Next, the action area specification unit 1 adds information concerning the specified action area to the input data S1 with the method described above to generate the action area specified data S2, and saves it into the storage device M2 (step F105).

Figure 4:
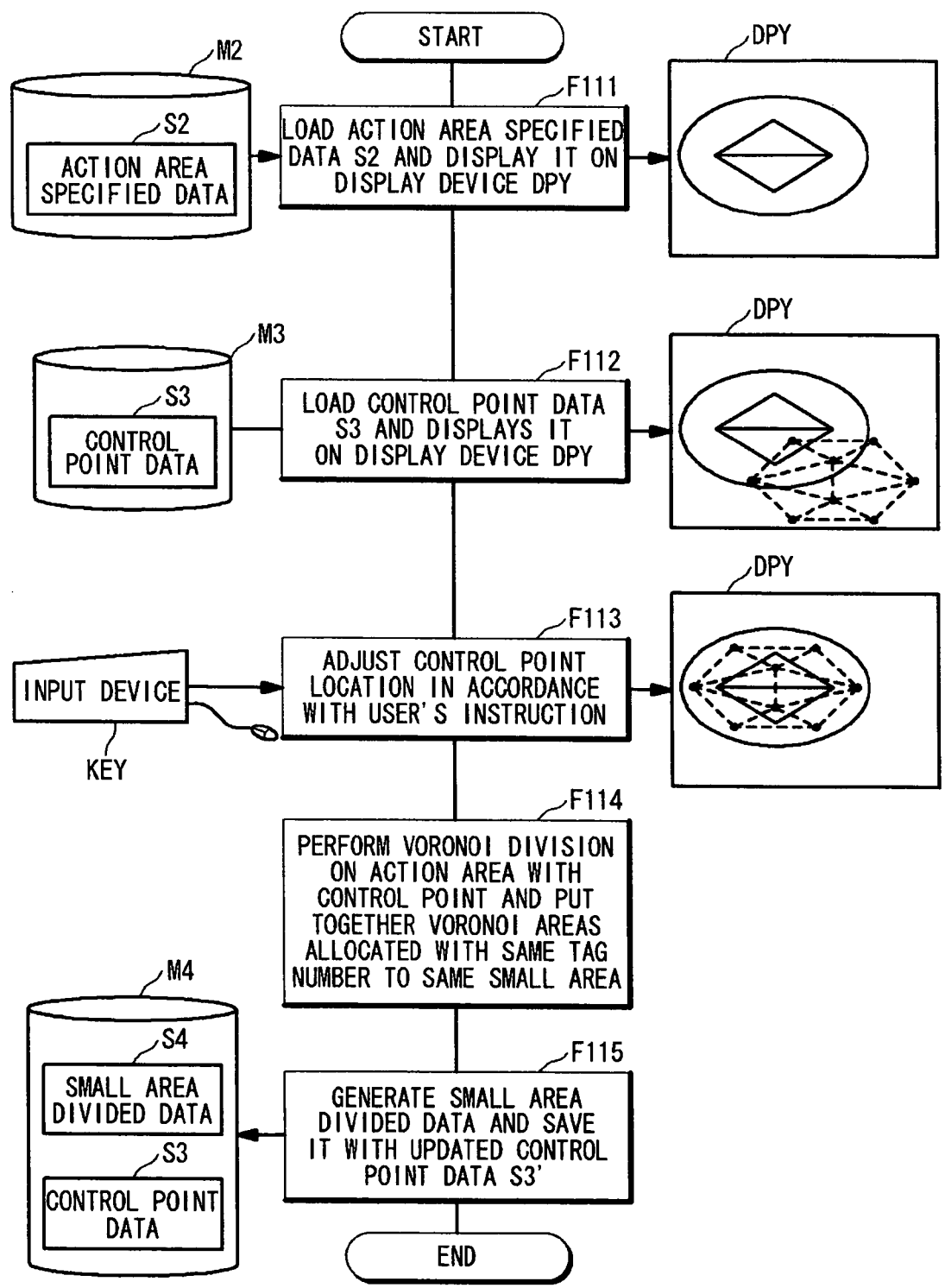
FIG. 4 is a flowchart showing an example of processing performed by the action area dividing unit in the shape deforming device according to the first embodiment of the present invention.

Next, the action area division unit 2 will be described. The action area division unit 2 inputs the action area specified data S2 from the storage device M2, generates, based on the control point data S3 inputted from the storage device M3, the small area divided data S4 in which the action area in the action area specified data S2 is divided into the plurality of small areas, and saves it into the storage device M4 together with the information of the control point data S3 (initial 3D coordinate adjusted control data S3'). This small area divided data S4 and the initial 3D coordinate adjusted control data S3' correspond to the face model described in FIG. 1. Hereinafter, the details of processing performed by the action area division unit 2 will be described, referring to FIG. 4.

First, the action area division unit 2 loads the action area specified data S2 from the storage device M2, and displays the action area thereof on the display device DPY, while enlarging it when necessary, so that the entire action area is displayed (step F111). Next, the action area division unit 2 loads the control point data S3 corresponding to the action area specified in the action area specified data S2 from the storage device M3, and displays it on the display device DPY (step F112). For example, if the action area specified in the action area specified data S2 is Action Unit No. 27 in the FACS (Open the mouth wide), the action area division unit 2 loads and displays the control point data corresponding to the Action Unit No. 27. Control point data S3 corresponding to a certain Action Unit includes information on a large number of control points evenly arranged at the end or inside of the muscles of facial expression that generates this Action Unit.

Figure 5:
FIG. 5 is a diagram showing an example of the configuration of control point data in the shape deforming device according to the first embodiment of the present invention.

FIG. 5 shows an example of the configuration of one control point data. In this example, the control point data includes a control point number (m) 2001 as an identifier allocated to this control point data, an initial 3D coordinate (X0, Y0, Z0) 2002 as an initial three-dimensional coordinate of this control point data, a tag number 2003 assigned to this control point data, an external force (fx, fy, fz) provided to this control point data, an end 3D coordinate (Xt, Yt, Zt) 2005 as a three-dimensional coordinate after movement of this control point data, and connection information 2006 on connection between this control point data and other control point data. Here, a same tag number is set for control point data belonging to a same small area. For the initial 3D coordinate 2002, the standard position of a control point in a standard face is initially set, so that an initial display of the control point is performed based on this initial 3D coordinate. The end 3D coordinate 2005 is a NULL value at the time of loading and its value is set at the time of subsequent calculation of the movement amount. Set in the connection information 2006 are: a control point number for control point data of a connection destination; and constants of the spring and the damper placed between the control point data and the control point data of the connection destination; and the like. When all the control points are connected together with springs and dampers of the same constants, these information needs not to be set in the connection information 2006 of all control point data, and thus it may be set in any one of them.

Next, the action area division unit 2 moves the position of each control point to a desired position in accordance with user's mouse dragging operation or the like, and also makes minor adjustment (step F113). In accordance with this adjustment, the initial 3D coordinate 2002 of the control point data is updated to a three-dimensional coordinate of a pixel, of those pixels located in the expressionless face image, that is closest to this control point. For example, when a certain control point having (Xa, Ya, Za) as the initial 3D coordinate 2002 is moved to a three-dimensional coordinate (Xb, Yb, Zb), and when a three-dimensional coordinate of the pixel located in the expressionless face image closest to this coordinate (Xb, Yb, Zb) is (Xc, Yc, Zc), the initial 3D coordinate 2002 of this control point is updated to (Xc, Yc, Zc). In this manner, the position of the control point is mapped in the pixel of the expressionless face image.

Next, the action area division unit 2 performs Voronoi division on the action area with the control point, allocates the tag number 2003 of this control point to the area defined by the Voronoi division, and puts together adjacent Voronoi areas allocated with the same tag number 2003 to thereby divide the action area into the plurality of small areas (step F114). Each small area is allocated with the same tag number as assigned to the Voronoi area composing this area. Therefore, small areas are generated in the same quantity as that of tags. Next, the image is generated as the small area divided data S4, by allocating the tag number of the small area to the pixels included therein for all pixels included in the divided area in the action area specified data S2, and then is saved into the storage device M4 together with the control point data S3' in which initial 3D coordinate has been already adjusted (step F115). Pixels on the boundary between two small areas are treated as those belonging to the plurality of these small areas. As the small area divided data S4, for each tag number, data containing recorded information on a pixel included in the small area provided with this tag number may be used.

Figure 6:
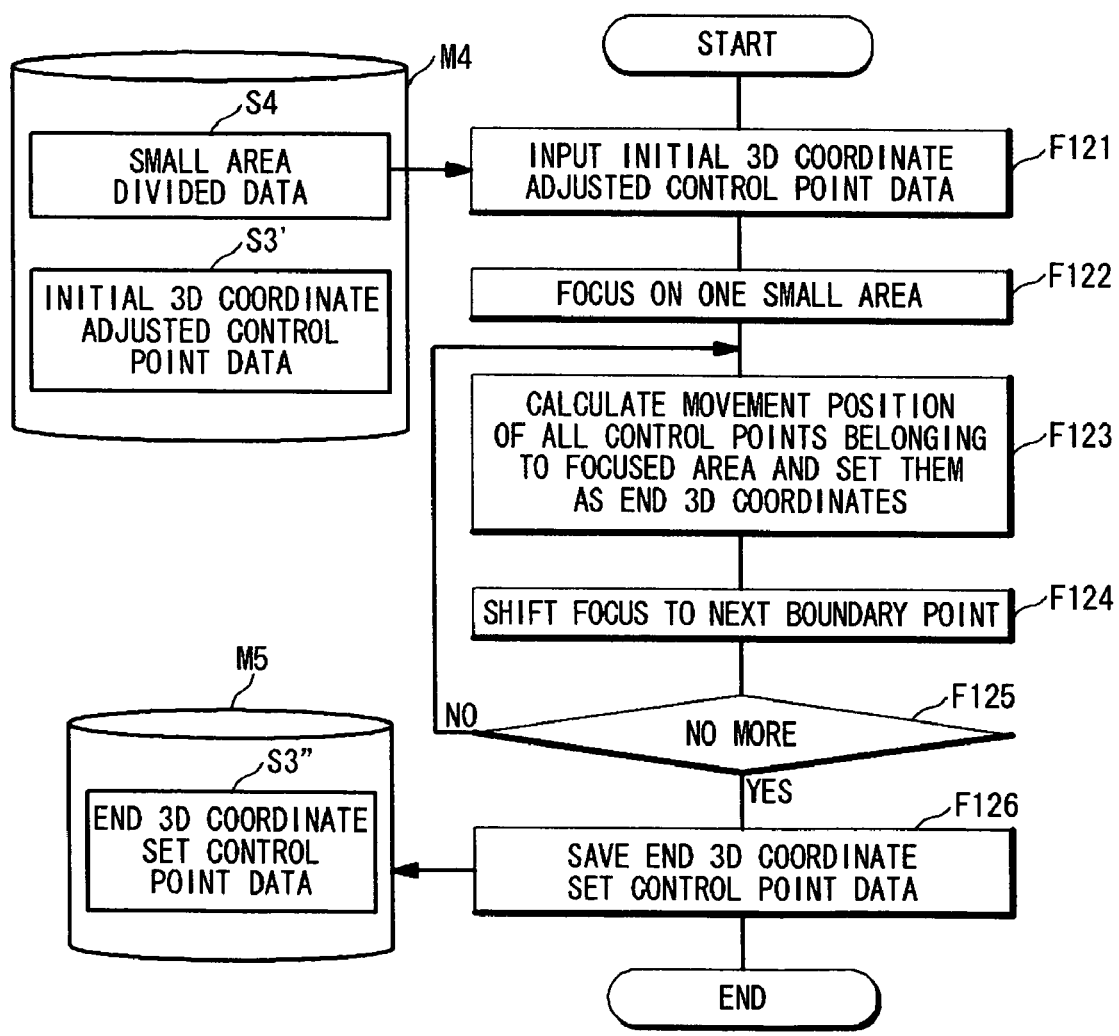
FIG. 6 is a flowchart showing an example of processing performed by control point action unit in the shape deforming device according to the first embodiment of the present invention.

Next, an operation performed by the control point action unit 3 will be described. The control point action unit 3 inputs from the storage device M4 the control point data S3' in which initial 3D coordinate has been already adjusted, and calculates, for each small area, the movement position of all the control points included in this small area. The calculation method is determined by what physical model is used to express the small area including this control point. In the case of the physical model as descried referring to FIG. 1 in which the control points in the small area are connected together with the springs and the dampers, as already described in detail, the movement position can be calculated by providing the boundary condition of the initial position and the initial speed and solving a two-step ordinary differential equation. As a more simple structure, for a model that is simply proportional to the external force, a gravity and an electromagnetic power models that are inversely proportional to the square of the distance from a particular point such as one of control points, center of gravity or the like, analytical calculation can be made by solving their respective corresponding equations. A detailed example of the operation performed by the control point action unit 3 will be described, referring to FIG. 6.

First, the control point action unit 3 inputs form the storage device M4 the control point data S3' in which initial 3D coordinate is adjusted (step F121). Next, the control point action unit 3 focuses on one small area, that is, one tag number (step F122). Next, the control point action unit 3 calculates the movement position of all the control points belonging to the focused small area and then sets them as the end 3D coordinates 2005 of these control point (step F123). All the control points belonging to the focused small area mean control points provided with the tag number 2003 having the same tag number to the small area. As described referring to FIG. 1, in the case of the structure in which control points in a small area are connected together with the springs and the dampers, based on the initial 3D coordinate 2002 and the external force 2004 of each control point data, the end 3D coordinate can be calculated by substituting predetermined parameters in the formula (7) Here, the predetermined parameters in the case of the formula (7) correspond to t, k, and d described above. These may be added to the control point data S3 so as to be loaded from the storage device M3, or may be previously embedded in the control point action unit 3.

After calculating the movement position of all the control points belonging to one small area and setting them as the end 3D coordinates 2005 of the control point data thereof, the control point action unit 3 shifts its focus to the next small area (step F124) and returns to step F123 to repeat the same processing as described above. The control point action unit 3 repeats this processing until the processing for all the small areas is completed (YES at step F125), and then saves into the storage device M5 the control point data S3" in which the end 3D coordinate 2005 is set (step F126).

Next, an operation performed by the action interpolation unit 4 will be described. The action interpolation unit 4 inputs the small area divided data S4 from the storage device M4 and also inputs the end 3D coordinate set control point data S3" from the storage device M5, calculates, by linear interpolation or extrapolation as shown in FIGS. 7A and 7B, the movement position of pixels other than the control points in each small area based on the movement position of the control point within the small area, generates an expressive action face image or three-dimensional data, and saves it as the output data S6 into the storage device M6. Calculation may be made with high-order interpolation or extrapolation such as Spline or the like. The output data S6 saved in the storage device M6 is displayed on the display device DPY automatically or in accordance with directions from the input device KEY.

A detailed operation performed by the action interpolation unit 4 will be described, referring to FIG. 8. First, the action interpolation unit 4 inputs the small area divided data S4 and the end 3D coordinate set control point data S3" from the storage device M4 and the storage device M5 (step F131). Next, the action interpolation unit 4 focuses on one small area within the action area in the small area divided data S4 (step F132), and then focuses on one pixel within the small area (step F133). Then, of the control points within the focused small area to which this pixel belongs, the action interpolation unit 4 searches over the end 3D coordinate set control point data S3" for three control point data each having an initial 3D coordinate closest to the three-dimensional coordinate of this pixel (step F134). Next, the action interpolation unit 4 judges whether or not the initial 3D coordinate of any one of the searched three control point data coincides with the three-dimensional coordinate of the focused pixel (step F135). If coincidation is observed, since the focused pixel is a control point, the action interpolation unit 4 saves the end 3D coordinate of this control point data in coincidence as the end 3D coordinate of the focused pixel in the focused small area (step F136). On the other hand, if coincidence is not observed, since the focused pixel is a non-control point, the action interpolation unit 4 calculates the movement position of the focused pixel by the method as shown in FIGS. 7A and 7B based on the end 3D coordinates of the three control point data (step F137), and saves the calculated movement position as the end 3D coordinate of the focused pixel in the focused small area (step F138).

Upon completing the processing on a pixel of the focused small area, the action interpolation unit 4 shifts its focus to the next one pixel within the focused small area (step F139), and repeats the same processing as the processing described above. Upon completing the processing on all the pixels within the focused small area (YES at step S140), the action interpolation unit 4 shifts its focus to the next one small area within the action area (step S141), and repeats the same processing as described above. Upon completing the processing on all the pixels in the all small areas within the action area (YES at step F142), the action interpolation unit 4 saves into the storage device M6 the output data S6 including the end 3D coordinate of each pixel within the action area (step F143).

Figure 9:
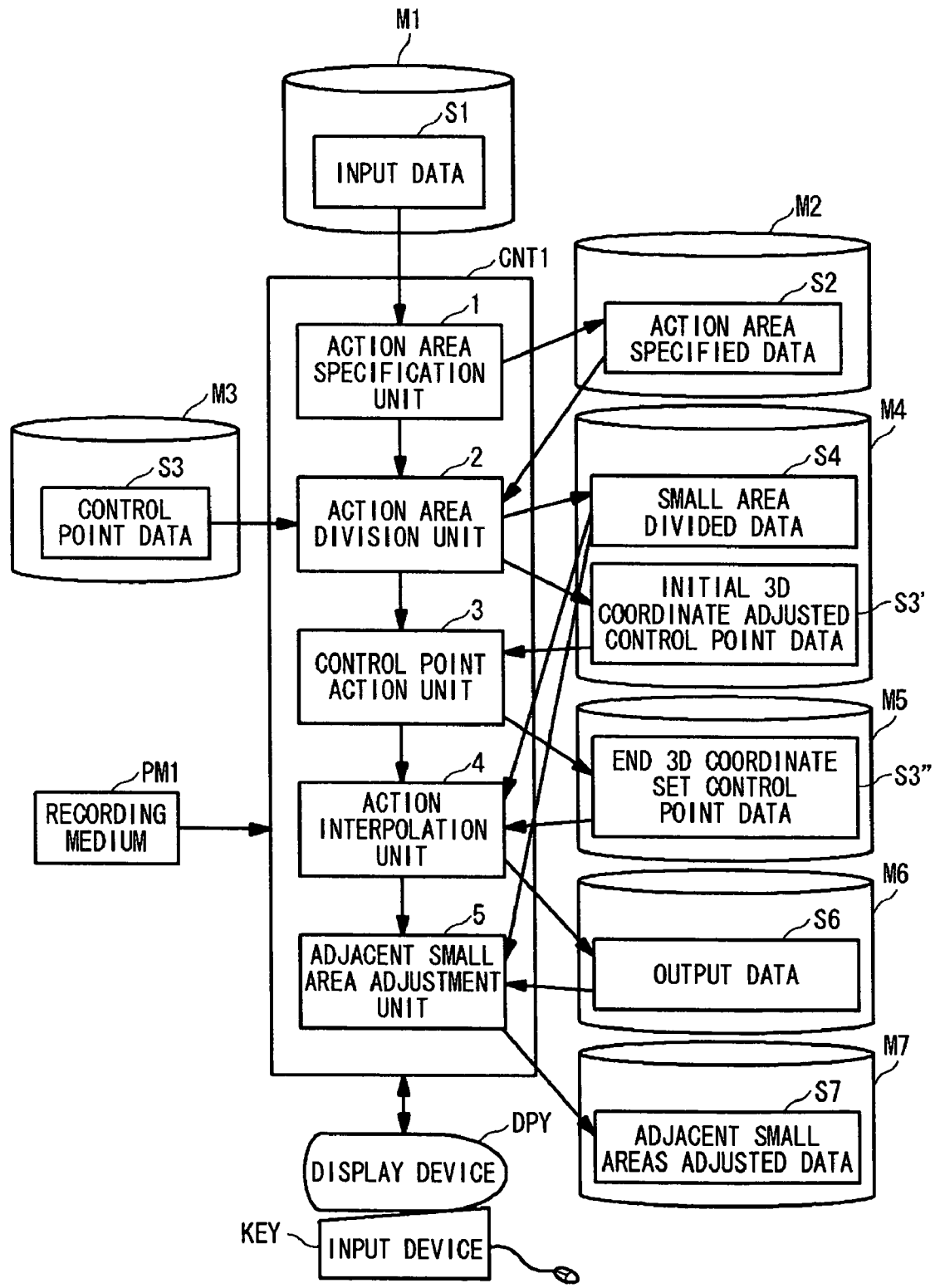
FIG. 9 is a block diagram of a shape deforming device according to a second embodiment of the present invention.

FIG. 9 shows the shape deforming device of the second embodiment according to the present invention. Referring to FIG. 9, the shape deforming device deforms a human expressionless face image into an expressive action face image. The shape deforming device of the second embodiment is different to the first embodiment shown in FIG. 2 in the point that it includes a storage device M7 and in the point that the processor further includes the adjacent small areas adjustment unit 5, and is same in other points.

Figure 10A:
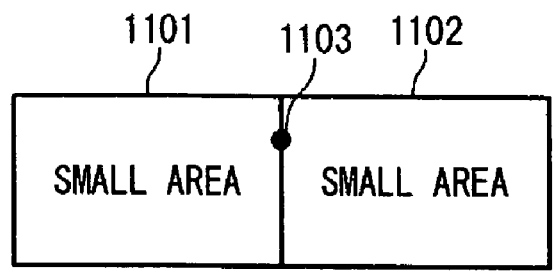
FIG. 10A is a diagram showing how discontinuous section such as a step difference or the like is formed at a boundary portion of a small area.
Figure 10B:
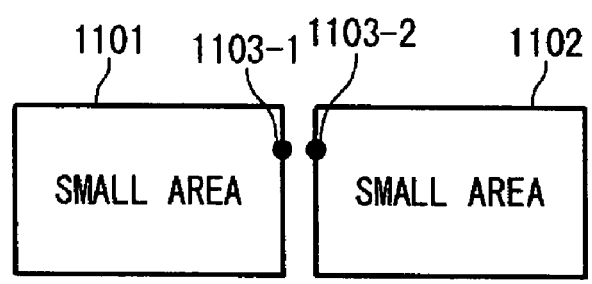
FIG. 10B is a diagram showing how discontinuous section such as a step difference or the like is formed at a boundary portion of a small area.
Figure 10C:
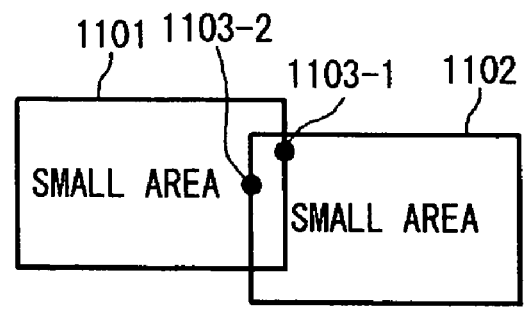
FIG. 10C is a diagram showing how discontinuous section such as a step difference or the like is formed at a boundary portion of a small area.

In the second embodiment, the action area is divided into a plurality of small areas, and the movement amount is calculated independently in units of small areas. Therefore, when there is a distinct difference in the movement amount between adjacent small areas, a discontinuous section such as a step difference or the like is formed at a boundary portion between these small areas. For example, as shown in FIG. 10A, when there arises a difference in the movement amount between two small areas 1001 and 1002 that are connected together before their movements, they may be separated from each other as shown in FIG. 10B, or they may be partially superimposed on each other as shown in FIG. 10C. The adjacent small areas adjustment unit 5 of this embodiment has a function of adjusting discontinuous condition occurring at the boundary portion between such small areas. As is the case with the other function units 1 to 4, the adjacent small areas adjustment unit 5 can be achieved by a program stored in the recording medium PM1 and a computer composing the processor CNT1.

Figure 11:
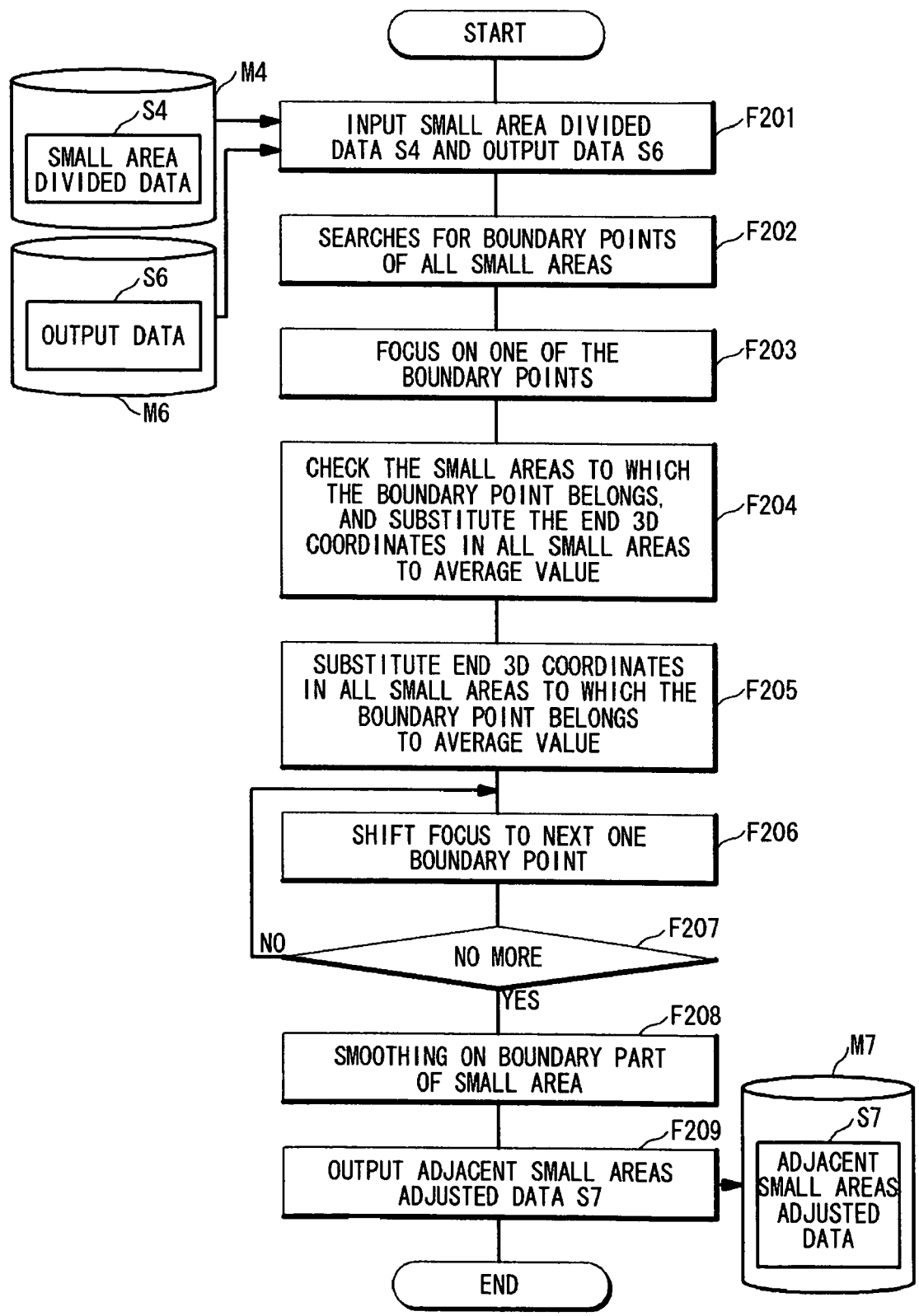
FIG. 11 is a flowchart showing an example of processing performed by adjacent small area adjustment unit in the shape deforming device according to the second embodiment of the present invention.

Next, an operation performed by the adjacent small areas adjustment unit 5 will be described, referring to FIG. 11. First, the adjacent small areas adjustment unit 5 inputs the small area divided data S4 and the output data S6 from the storage device M4 and the storage device M6 (step F201). Next, the adjacent small areas adjustment unit 5 searches for all boundary points of all small areas based on the small area divided data S4 (step F202). The boundary point of a small area denotes a pixel located on a boundary between a plurality of adjacent small areas. Such a pixel belongs to a plurality of small areas; therefore, all the pixels belonging to a plurality of small areas can be all extracted from the small area divided data S4.

Next, the adjacent small areas adjustment unit 5 focuses on one of the boundary points searched at step F202 (step F203), checks the small areas to which this boundary point belongs from the small area divided data S4 and extracts the end 3D coordinates in all the small areas it belongs from the output data S6, and then obtains the average thereof (median is acceptable) (step F204). For example, when a certain one boundary point 1100 shown in FIG. 10A has a point 1103-1 as the end 3D coordinate (Xa, Ya, Za) for the small area 1101 and has a point 1103-2 as the end 3D coordinate (Xb, Yb, Zb) for the small area 1102 as shown in FIG. 10B and FIG. 10C after movement, the adjacent small areas adjustment unit 5 calculates [(Xa+Xb)/2, (Ya+Yb)/2, (Za+Zb)/2)]. Next, the adjacent small areas adjustment unit 5 updates, with this calculated average value, the end 3D coordinates in all the small areas to which this boundary point belongs (step F205). More specifically, the adjacent small areas adjustment unit 5 updates the end 3D coordinate (Xa, Ya, Za) at the point 1103-1 to [(Xa+Xb)/2, (Ya+Yb)/2, (Za+Zb)/2)] and similarly updates the end 3D coordinate (Xb, Yb, Zb) at the point 1103-2 to [(Xa+Xb)/2, (Ya+Yb)/2, (Za+Zb)/2)]. This update is performed on a copy of the output data S6 inputted in the processor CN1.

Upon completing the processing on one boundary point, the adjacent small areas adjustment unit 5 shifts its focus to the next one boundary point (step F206), and returns to step F204 to repeat the same processing as described above. Upon completing the processing on all the boundary points (YES at step F207), the adjacent small areas adjustment unit 5 performs smoothing processing on the boundary part of the small area (step F208).

Figure 12:
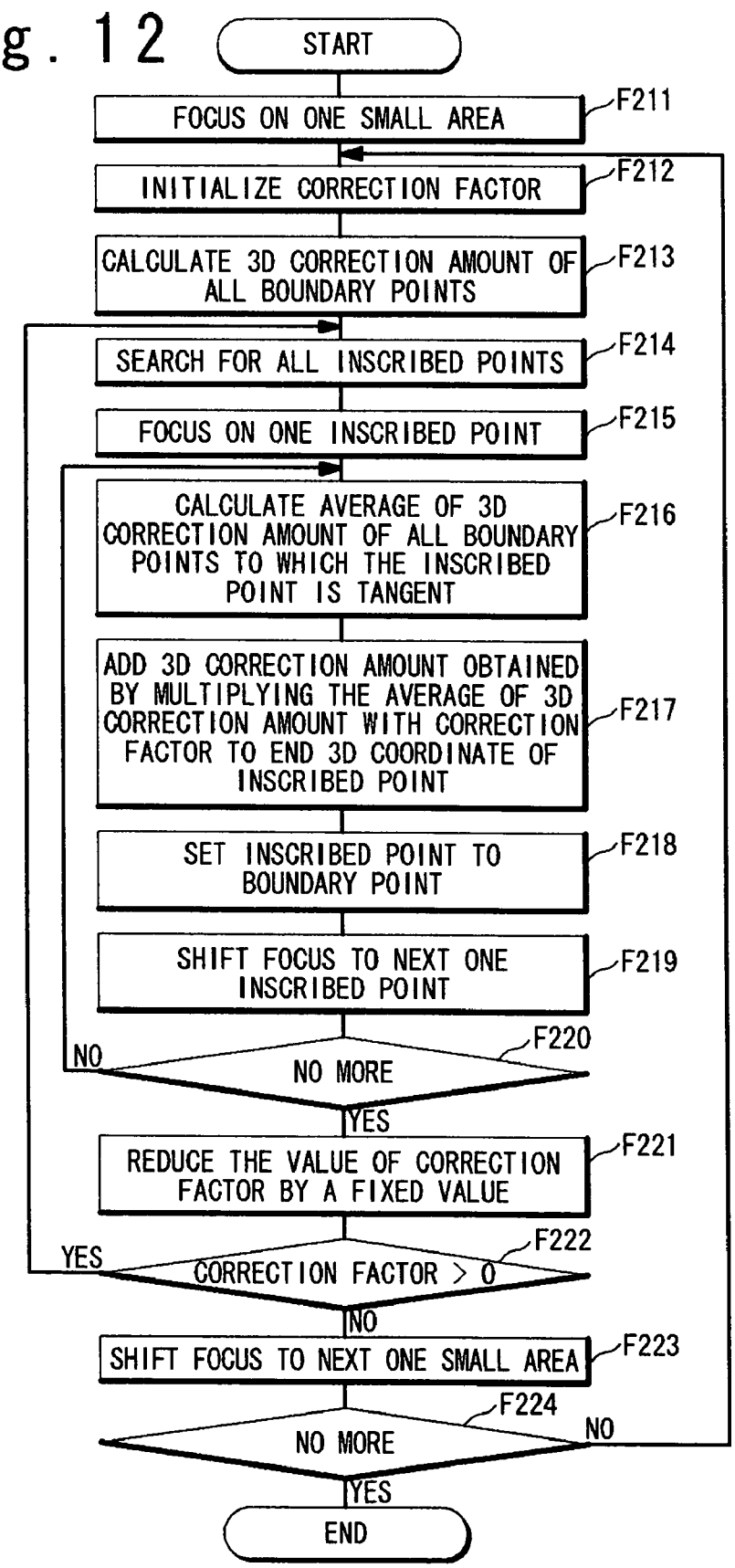
FIG. 12 is a flowchart showing an example of smoothing processing performed by the adjacent small area adjustment unit in the shape deforming device according to the second embodiment of the present invention.

In the smoothing processing on the boundary part of the small area, the adjacent small areas adjustment unit 5 smoothes the boundary part for each small area by transmitting, to pixels near this boundary point, the amount of change made at the boundary point in which end 3D coordinate has been changed at step S205. FIG. 12 shows the details of this smoothing processing F208.

First, the adjacent small areas adjustment unit 5 focuses on one small area (step F211), and initializes the correction factor to a value smaller than and closer to 1 (step F212). Next, the adjacent small areas adjustment unit 5 calculates the 3D correction amounts of all the boundary points between the focused small area and its adjacent small areas (step F213). The 3D correction amount of the boundary point is a difference between the end 3D coordinate of this boundary point in the focused small area exist in the output data S6 and the average of the end 3D coordinates, calculated at step F204 of FIG. 11, in all the small areas to which this boundary point belongs. For example, assuming that the end 3D coordinate of a certain boundary point in a certain small area is (Xa, Ya, Za) and that the average of the end 3D coordinates, calculated at step F204 of FIG. 11, in all the small areas to which this boundary point belongs is [(Xa+Xb)/2, (Ya+Yb)/2, (Za+Zb)/2)], the 3D correction amount is obtained as [(Xa+Xb)/2−Xa], [(Ya+Yb)/2−Ya], [(Za+Zb)/2−Za].

Figure 13:
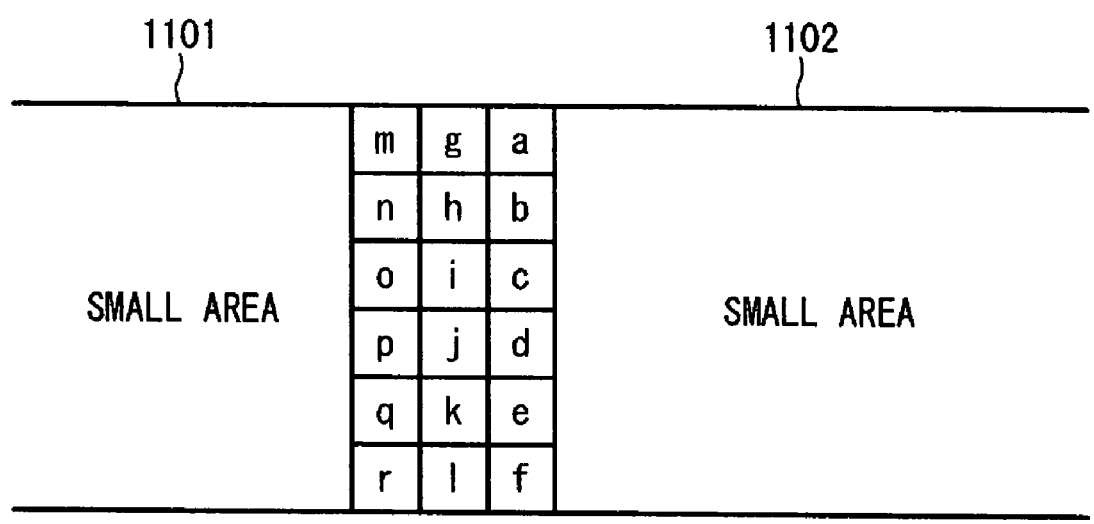
FIG. 13 is an explanatory diagram of an operation performed by the adjacent small area adjustment unit in the shape deforming device according to the second embodiment of the present invention.

Next, the adjacent small areas adjustment unit 5 searches for all the pixels tangent to the boundary point in the focused small area as inscribed points (step F214). For example, of the two small area 1101 and 1102 tangent to each other as shown in FIG. 13, when the small area 1101 is focused, pixels a to f located on the boundary formed with the small area 1102 are original boundary points; therefore, pixels g to l tangent to the pixels a to f are obtained as inscribed points.

Next, the adjacent small areas adjustment unit 5 focuses on one inscribed point (step F215), and calculates the average (median is acceptable) of the 3D correction amounts of all the boundary points to which this inscribed point is tangent (step F216). For example, when focusing on the pixel g of FIG. 13 as one inscribed point, since the boundary points tangent to this point are pixels a and b, the adjacent small areas adjustment unit 5 calculates the average of the 3D correction amount of the pixel a and the 3D correction amount of the pixel b. Next, the adjacent small areas adjustment unit 5 adds, to the end 3D coordinate of this inscribed point, the 3D correction amount obtained by multiplying this calculated average of the 3D correction amounts with the correction factor (step F217), and then treats this inscribed point as a new boundary point (step F218). Upon completing the processing on one inscribed point, the adjacent small areas adjustment unit 5 shifts its focus to the next one inscribed point (step F219). For example, after processing the pixel g of FIG. 13, the adjacent small areas adjustment unit 5 shifts its focus to the pixel h and returns to step F216 to repeat the same processing as described above. Upon completing the processing on all the inscribed points g to l found at step F214 in this manner (YES at step F220), the adjacent small areas adjustment unit 5 reduces the value of the correction factor by a fixed value (for example, 0.1, 0.2, or the like) previously defined (step F221) and returns to step F214 if the value of the correction factor is larger than 0 (YES at step F222). In the case of FIG. 13, once the pixels g to l are processed, these pixels g to l are treated as new boundary points; therefore, an aggregate of new inscribed points searched at step F221 becomes pixels m to r. In this manner, the 3D correction amounts of the original boundary points a to f are transmitted to the surrounding pixels to thereby achieve smoothening thereof.

When the value of the correction factor becomes 0 or below, the adjacent small areas adjustment unit 5 ends the smoothing processing on the focused small area, and shifts its focus to the next one small area (step F223), and returns to step F212 to repeat the same processing as described above. Upon completing the processing on all the small areas (YES at step F224), the adjacent small areas adjustment unit 5 ends the smoothing processing F208 on the boundary parts of the small areas.

Upon completing the smoothing processing on the boundary parts of the small areas, the adjacent small areas adjustment unit 5 outputs to the storage device M7 adjacent small areas adjusted data S7, i.e., output data in which discontinuous condition occurring at the boundary portion between small areas in the output data S6 has been adjusted. The output data S7 saved into the storage device M7 is displayed on the display device DPY automatically or in accordance with directions from the input device KEY.

Figure 14:
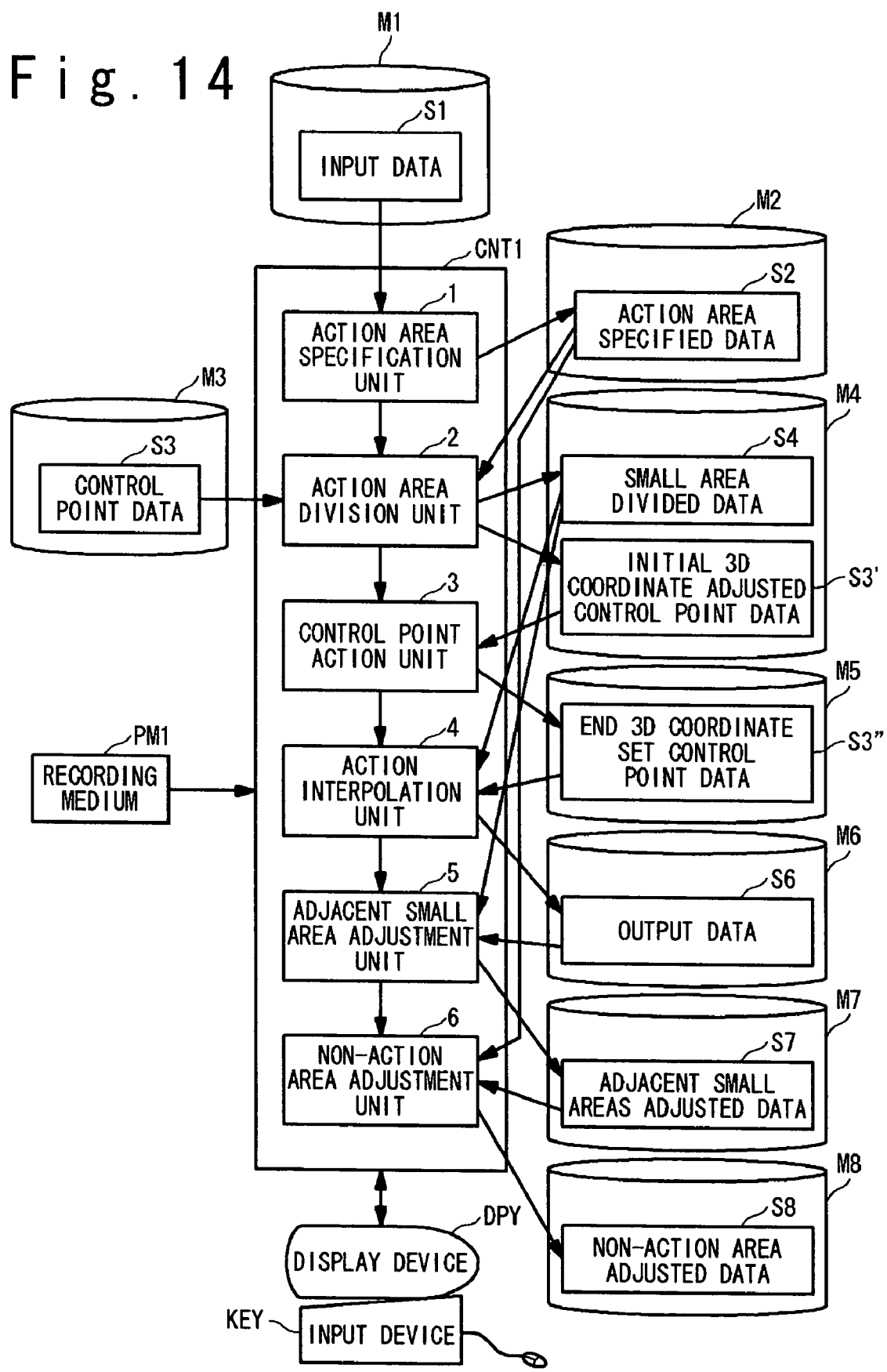
FIG. 14 is a block diagram of a shape deforming device according to a third embodiment of the present invention.

FIG. 14 shows the shape deforming device of the third embodiment of the present invention according to the present invention. The shape deforming device of the third embodiment deforms a human expressionless face image into an expressive action face image. The shape deforming device of the third embodiment is similar to the shape deforming device of the second embodiment, but is different to the shape deforming device of the second embodiment in the point that it includes the storage device M8 and the processor CNT1 further has the non-action area adjustment unit 6.

Figure 15A:
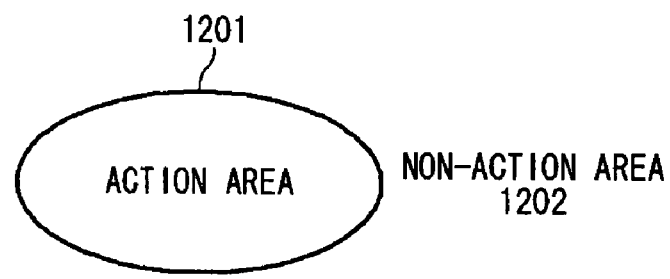
FIG. 15A is a diagram showing how discontinuous section such as a step difference or the like is formed at a boundary portion between an action area and a non-action area.
Figure 15B:
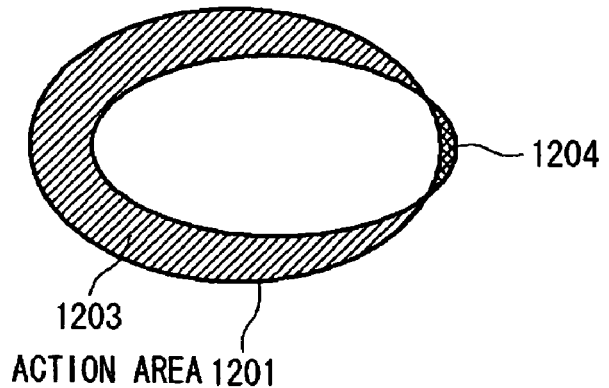
FIG. 15B is a diagram showing how discontinuous section such as a step difference or the like is formed at a boundary portion between an action area and a non-action area.

As described in FIG. 1, at least one action area 1001 is set on the entire face area 1000, and when the action area 1001 is subjected to deformation, a discontinuous section such as a step difference or the like may be created at a boundary portion between the action area 1001 and the non-action area at expressive action. For example, as shown in FIG. 15A, of the action area 1201 and the non-action area 1202 tangent to each other in an expressionless image, only the action area 1201 moves, and thus as shown in FIG. 15B, a portion 1203 may be formed where the action area 1201 and a non-action area 1202 are superimposed on each other, or a gap 1204 may be formed between the action area 1201 and the non-action area 1202. The non-action area adjustment unit 6 of this embodiment has a function of adjusting a discontinuous state occurring at the boundary portion between such the action area and such the non-action area. As is the case with the other function units 1 to 5, the non-action area adjustment unit 6 can be realized by a program stored in the recording medium PM1 and a computer composing the processor CNT1.

Figure 17:
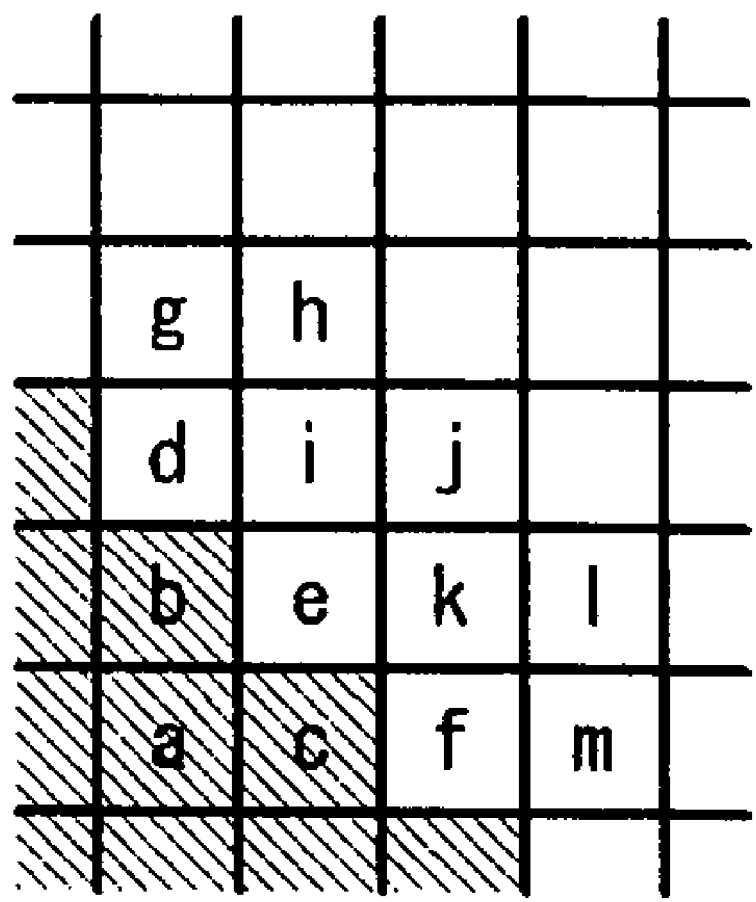
FIG. 17 is an explanatory diagram of an operation performed by the non-action area adjustment unit in the shape deforming device according to the third embodiment of the present invention.

Next, an operation performed by the non-action area adjustment unit 6 will be described referring to FIG. 16. First, the non-action area adjustment unit 6 inputs the action area specified data S2 and the adjacent small areas adjusted data S7 from the storage device M2 and the storage device M7 (step F301). Next, the non-action area adjustment unit 6 initializes the correction factor to a value smaller than and closer to 1 (step F302). Next, the non-action area adjustment unit 6 calculates the 3D movement amounts of all inner boundary points based on the action area specified data S2 (step F303). The inner boundary point denotes a pixel, of those belonging to the action area, which is located on the boundary formed with the non-action area. For example, as shown in FIG. 17, assuming that a square provided with hatching is a pixel belonging to the original action area, pixels a, b, c, and the like located on the boundary formed with the non-action area and not provided with hatching are internal boundary points. The 3D movement amount of the internal boundary point denotes a difference between the 3D coordinate of this internal boundary point on the action area specified data S2 (that is, the position at non-expression) and the 3D coordinate (that is, the position at expressive action) thereof on the adjacent small areas adjusted output data S7.

Next, the non-action area adjustment unit 6 searches for all external boundary points based on the action area specified data S2 (step F304). The external boundary point denotes a pixel, of those in the non-action area, which is located on the boundary of the action area. For example, in an example of FIG. 17, pixels d, e, f and the like are external boundary points.

Next, the non-action area adjustment unit 6 focuses on one of the outer boundary points searched at step F304 (step F305), and obtains the average (median is acceptable) of the 3D movement amounts of all the inner boundary points to which this outer boundary point is tangent (step F306). For example, when focusing on the pixel e shown in FIG. 17 as one outer boundary point, since all the inner boundary points tangent to this pixel e are the pixels a, b, and c, the non-action area adjustment unit 6 obtains the average of the 3D movement amounts thereof. Next, the non-action area adjustment unit 6 adds a 3D movement amount obtained by multiplying this calculated average value with the correction factor to the end 3D coordinate of this outer boundary point (step F307), and then treats this outer boundary point as a point of the action area (step F308). Upon completing the processing on one outer boundary point, the non-action area adjustment unit 6 shifts its focus to the next one outer boundary point (step F309). For example, after processing the pixel e of FIG. 17, the non-action area adjustment unit 6 shifts its focus to the pixel f and returns to step F306 to repeat the same processing as described above. Upon completing the processing on all the outer boundary points found at step F364 in this manner (YES at step F310), the non-action area adjustment unit 6 reduces the value of the correction factor by a fixed value (for example, 0.1, 0.2, or the like) previously defined (step F311), and returns to step F304 if the value of the correction factor is larger than 0 (YES at step F312). In the case of FIG. 17, once the pixels d to f and the like are processed, these pixels d to f and the like are treated as new action points; therefore, an aggregate of new outer boundary points searched at step F304 becomes pixels g to m and the like. In this manner, the 3D movement amounts of the original boundary points a to c are transmitted to the pixels in the non-action area to thereby achieve smoothening thereof.

The non-action area adjustment unit 6 completes the adjustment processing on the non-action area when the value of the correction factor becomes 0 or below, and outputs to the storage device M8 non-action area adjusted data S8, that is, output data in which a discontinuous state occurring at a boundary portion between the action area and the non-action area in the adjacent small areas adjusted output data S7 has been adjusted. The output data S8 saved into the storage device M8 is displayed on the display device DPY automatically or in accordance with directions from the input device KEY.

In the configuration of FIG. 13, after executing the adjacent small areas adjustment unit 5, the non-action area adjustment unit 6 is executed. Alternatively, the non-action area adjustment unit 6 may be initially executed to generate data free from non-continuity at a boundary portion between the action area and the non-action area which is eliminated from the output data S6, and then the adjacent small areas adjustment unit 5 may be executed to further generate data free from non-continuity at a boundary portion between the small areas which has been resolved. Moreover, the adjacent small areas adjustment unit 5 may be omitted and thus adjustment may be executed only by the non-action area adjustment unit 6.

Figure 18:
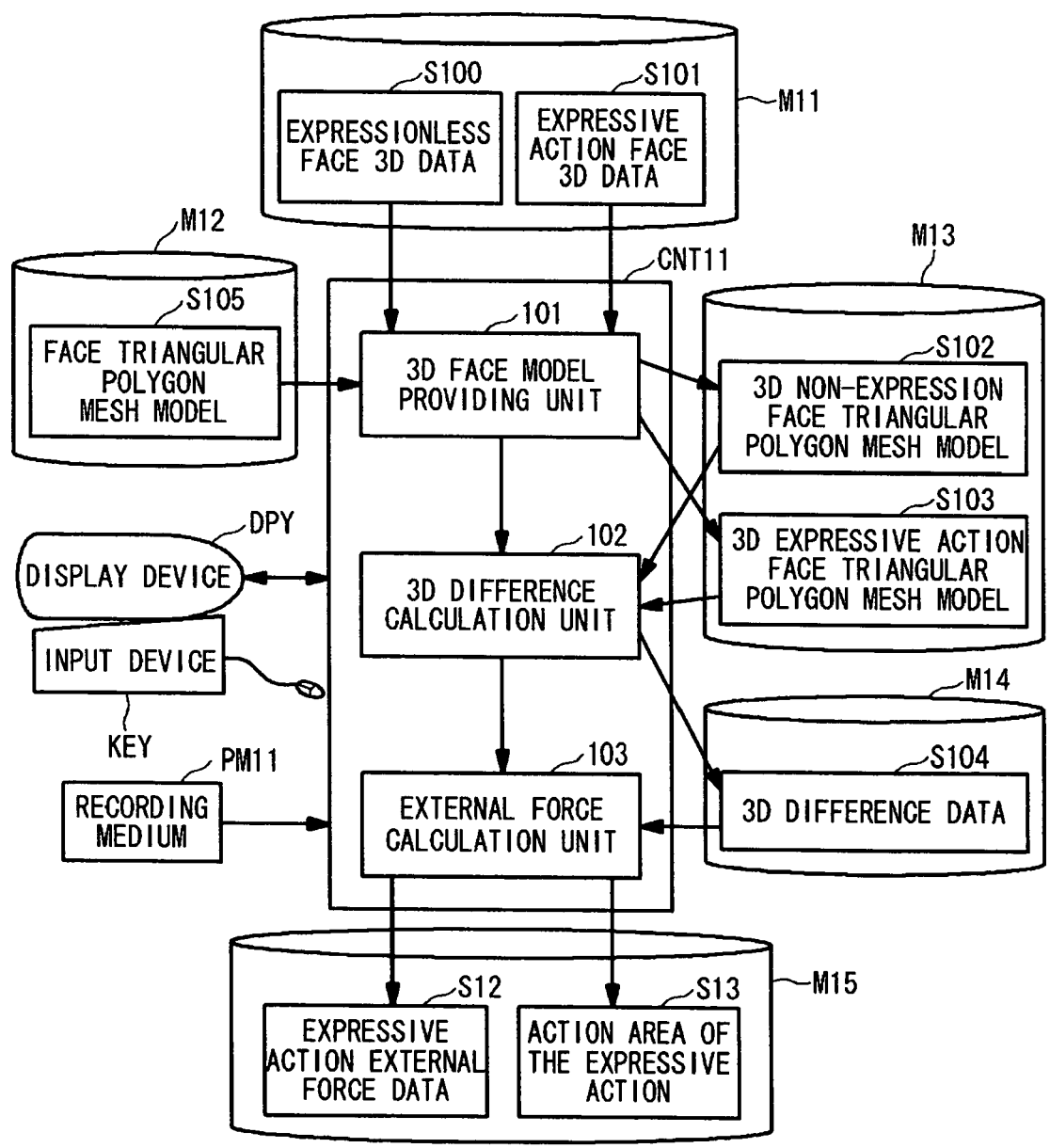
FIG. 18 is a block diagram of a facial action encoding device according to a fourth embodiment of the present invention.

FIG. 18 is a block diagram of the facial action encoding device according to the fourth embodiment of the present invention, which calculates and outputs the action area and the external force at expressive action from the face three-dimensional data of a certain person at non-expression and at expressive action. The facial action encoding device of this embodiment includes a processor CNT11, storage devices M11 to M15, a display device DPY, and an input device KEY. A plurality of storage devices M11 to M15 are each composed of, for example, the magnetic disc. Of these devices, the storage device M11 stores the expressionless face 3D data S110 and expressive action face 3D data S101 as input data, the storage device M15 stores the external force data S12 of the expressive action and an action area S13 of the expressive action as output data, and the other storage devices M12 to M14 store the interim results or a control data required in the course of processing. The display device DPY is composed of, for example, the liquid crystal display, and is used for displaying data in the course of processing and the like. The input device KEY is composed of, for example, a keyboard and a mouse, and is used for accepting various kinds of data and directions from a user. The controller CNT11 is composed of, for example, a central processor of the computer, and executes main processing performed by the facial action encoding device of this embodiment. The controller CNT11 has 3D face model providing unit 101, 3D difference calculation unit 102, and external force calculation unit 103.

Each of the function units 101 to 103 of the controller CNT11 can be realized by a computer composing the controller CNT11 and a program for the facial action encoding device. The program for the facial action encoding device is recorded on a computer-readable recording medium PM11 such as the magnetic disc, and is read by the computer at times such as computer start-up and the like, and realizes the function units 101 to 103 on the computer by controlling the operation of the computer.

Next, an operation performed by the facial action encoding device according to this embodiment will be described. The controller CNT11 first inputs, by using the 3D face model providing unit 101, the expressionless face three-dimensional data S100 and the expressive action face three-dimensional data S101 of a person stored in the storage device M11 and used for encoding, and then matches face triangular polygon mesh model S105 previously prepared in the storage device M12 for each data to thereby generate face triangular polygon mesh models S102 and S103 at non-expression and at expressive action, respectively, and saves them into the storage device M13. Next, by using the 3D difference calculation unit 102, the controller CN11 inputs the face triangular polygon mesh models S102 and S103 at non-expression and at expressive action, respectively, from the storage device M13, and generates, through comparison between the two, 3D difference data S104 including three-dimensional coordinates, before and after movement, of a polygon and each vertex thereof that moves when a change from the expressionless face to the expressive action face occurs, and then saves it into the storage device M14. Next, by using the external force calculation unit 103, the controller CN11 inputs the 3D difference data S104 from the storage device M14, calculates, by the formula (7) described above, an external force to be applied to each vertex of the face triangular polygon of the expressionless face in order to deform the expressionless face into the expressive action face, and then outputs to the storage device M15 the action area S13 of the expressive action including information on a polygon moved when the change from the expressionless face to the expressive action face occurs and the expressive action external force data S12 including the external force to be applied to each vertex of the polygon. Hereinafter, a detailed description will be given.

The face three-dimensional data S100 and S101 at non-expression and at expressive action inputted to the three-dimensional face model providing unit 101 is obtained by unit for obtaining three-dimensional data of the face and is stored into the storage device M11. The three-dimensional data of the face may be data measured with arbitrary unit such as a light-irradiation-type range finder, a stereo image measurement by stereo-multilens camera, MRI measurement, infrared measurement or the like, or may be artificial data generated by three-dimensional computer graphics. It is desirable that a texture as information accompanying three-dimensional data be provided for carrying out the comparison in portions between two face data, but it is not essential when different unit for finding the correlation in portions between two face data is provided. For example, possible cases include: a case in which a particular marker that reflects light is attached to the face when obtaining the data with the light-irradiation-type range finder; a case in which a marker is attached which has a temperature different from the body temperature when obtaining the data with an infrared image; and the like. Even when a texture is to be obtained, a texture of the entire face is not essential, in cases such as when a marker is drawn on part of the face.

Figure 19:
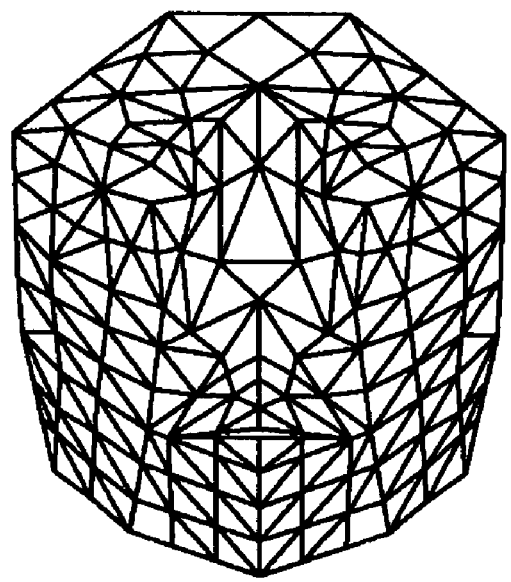
FIG. 19 is a diagram showing one example of a face triangular polygon mesh model used in the facial action encoding device according to the fourth embodiment of the present invention.

In the storage device M12, the face triangular polygon mesh model S105 as shown in FIG. 19 is saved. The number of polygons and the size of individual polygons are arbitrary, and the face triangular polygon mesh model S105 is generated so that part of vertexes thereof correlates with a facial feature point. The three-dimensional face model providing unit 101 generates the three-dimensional expressionless face triangular polygon mesh model S102 by matching the face triangular polygon mesh model S105 with the expressionless face three-dimensional data S100. More specifically, the expressionless face three-dimensional data S100 and the face triangular polygon mesh model S105 are displayed on the screen of the display device DPY, and by operation made by the user through the input device KEY, each vertex of the face triangular polygon mesh model S105 is mapped on a facial feature point to be correlated with this vertex. Using the feature point of the expressionless face three-dimensional data S100 as a clue, a part of the vertexes of the face triangular polygon mesh model S105 can also be automatically correlated. For example, in a case where a particular vertex of a particular polygon of the face triangular polygon mesh model S105 is a vertex to be correlated with the tip of the nose, the position of a marker provided to the tip of the nose is detected to automatically provide correlation. The three-dimensional face model providing unit 101 allocates each vertex of each polygon in the face triangular polygon mesh model S105 with a three-dimensional coordinate of a point of the expressionless face three-dimensional data S100 correlated to this vertex, and then saves, into the storage device M13, one having the vertexes of all the polygons thereof respectively allocated with three-dimensional coordinates of points of the expressionless face three-dimensional data S100 as the three-dimensional expressionless face triangular polygon mesh model S102.

In the same manner, the three-dimensional face model providing unit 101 generates the three-dimensional expressive action face triangular polygon mesh model S103 by matching the face triangular polygon mesh model S105 with the expressive action face three-dimensional data S101.

Figure 20:
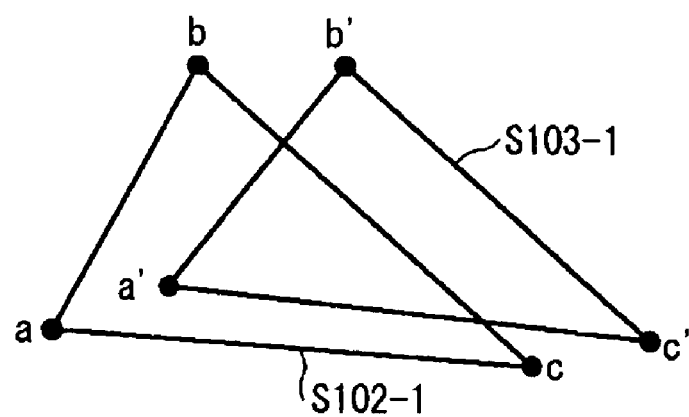
FIG. 20 is an explanatory diagram showing of an operation performed by a three-dimensional difference calculation unit in the facial action encoding device according to the fourth embodiment of the present invention.

The three-dimensional difference calculation unit 102 calculates a difference in a three-dimensional coordinate at the same vertex of the same polygon between the three-dimensional expressionless face triangular polygon mesh model S102 having each vertex of each polygon thereof assigned with a three-dimensional coordinate of an expressionless face and the three-dimensional expressive action face triangular polygon mesh model S103 having each vertex of each polygon thereof assigned with a three-dimensional coordinate of the expressive action face. For example, assuming that the same polygons of the models S102 and S103 are S102-1 and S103-1, respectively, as shown in FIG. 20, the three-dimensional difference calculation unit 102 calculates difference in an three-dimensional coordinate between the same vertexes a and a', between the same vertexes b and b', and between the same vertexes c and c'. Then an area whose norm of difference in the three-dimensional coordinate, that is, the distance, is equal to or larger than a predetermined threshold value is defined as the action area at expression, and other areas are defined as non-action areas. In this embodiment, points exist only at the three vertexes of the triangular polygon; therefore, the action area is determined in units of polygons. That is, if any of the three vertexes of the polygon is a point of the action area, this polygon is treated as the action area, and if not, the polygon is treated as the non-action area. In this embodiment, each of the small areas into which the action area is divided is a triangular polygon. The three-dimensional difference calculation unit 102 saves, into the storage device M14, data including the polygon number of the face triangular polygon mesh model of the action area determined in this manner and three-dimensional coordinates of the expressionless face and the expressive action face assigned to the vertex thereof as the three-dimensional difference data S104.

FIG. 21 shows an example of the contents of the three-dimensional difference data S104. The three-dimensional difference data S104 is composed of a polygon number m set for each polygon of the face triangular polygon mesh model S105, a vertex numbers i set for each vertex of each polygon thereof, a flag indicating whether or not a polygon including this vertex is the action area, the three-dimensional coordinate of the expressionless face corresponding to this vertex, and the three-dimensional coordinate of an expressive action face corresponding to this vertex.

Figure 22A:
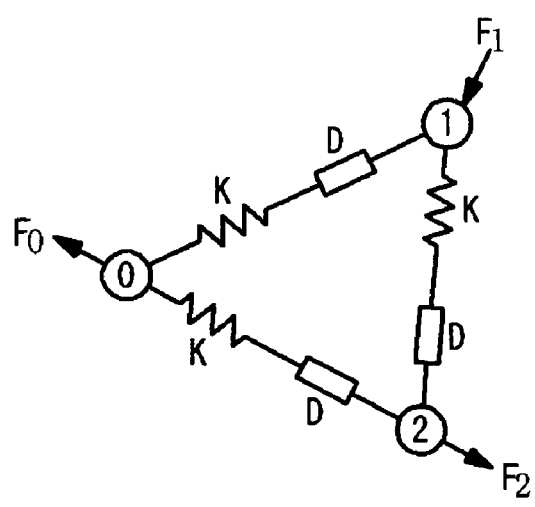
FIG. 22A is an explanatory diagram showing an operation performed by an external force calculation unit in the facial action encoding device according to the fourth embodiment of the present invention.
Figure 22B:
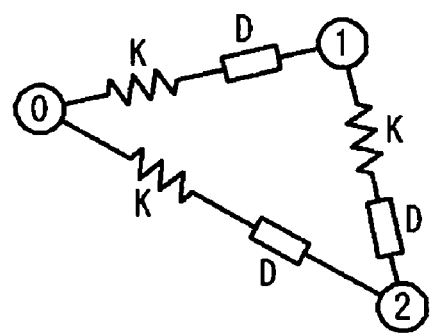
FIG. 22B is an explanatory diagram showing an operation performed by an external force calculation unit in the facial action encoding device according to the fourth embodiment of the present invention.

The external force calculation unit 103 inputs from the three-dimensional difference data S104 data of a polygon serving as the action area, and then calculates, using a three-dimensional coordinate at non-expression and the three-dimensional coordinate at expressive action for the vertex of this polygon, and a required parameter, an external force required for moving each vertex from the position at non-expression to the position at expressive action. More specifically, the external force calculation unit 103 calculates the external force $F_i$ by providing the formula (7) described above with: parameters t, k, and d; xi(0) as a three-dimensional coordinate of a control point at non expression; xi(t) as a three-dimensional coordinate of a control point at expressive action; and its initial condition. The control points can be set in the polygon in any manner. As the simplest case, in this embodiment, three vertexes of the polygon are set as control points as in FIG. 22. In this case, calculation is possible with the element of the matrix (6) as n=3.

Figure 23:
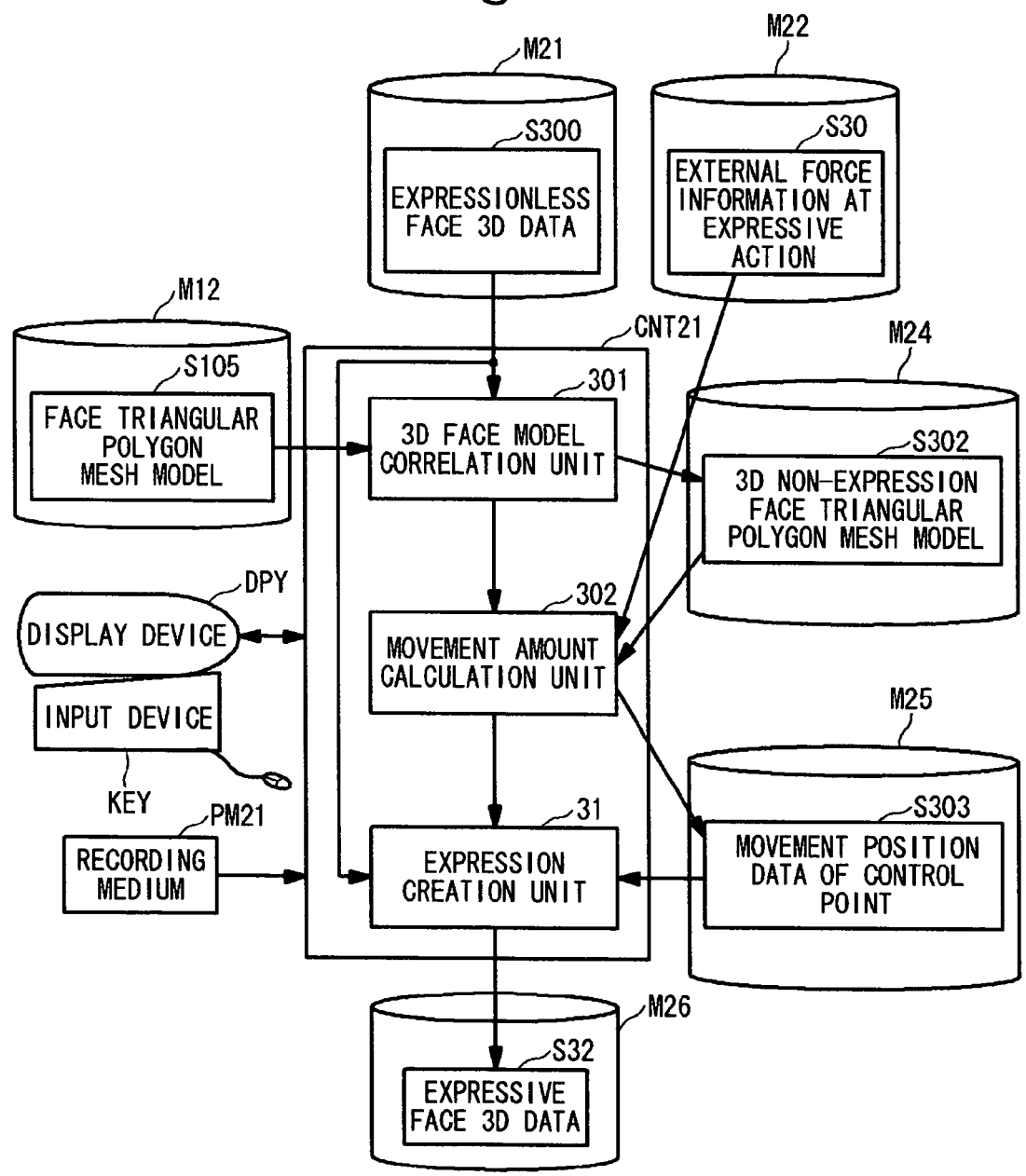
FIG. 23 is a block diagram of a facial action decoding device according to a fifth embodiment of the present invention.

FIG. 23 is a block diagram of the facial action decoding device according to the fifth embodiment of the present invention, which deforms the expressionless face three-dimensional data of a certain person based on the external force information at expressive action and generates and outputs the face three-dimensional data of the person at expressive action. The facial action decoding device of this embodiment is composed of a processor CNT21, storage devices M21 to M26, display device DPY, and input device KEY. A plurality of storage devices M21 to M26 are each composed of, for example, the magnetic disc. Of these devices, the storage devices M21 and M22 store the expressionless face 3D data S300 and external force information S30 at expressive action as input data, the storage device M26 stores the expressive face 3D data 32 as output data, and the other storage devices M23 to M25 store control data required for the interim results or in the course of processing. The display device DPY is composed of, for example, the liquid crystal display, and is used for displaying the generated expressive face 3D data 32, data in the course of processing, and the like. The input device KEY is composed of, for example, the keyboard and the mouse, and is used for accepting various kinds of data and instructions from the user. The controller CNT21 is composed of, for example, the central processor of the computer, and executes main processing performed by the facial action decoding device of this embodiment. The controller CNT21 has a 3D face model correlation unit 301, an movement amount calculation unit 302, and an expression creation unit 31.

Each of the function units 301, 302, and 31 of the controller CNT12 can be realized by the computer composing the controller CNT21 and a program for the facial action decoding device. The program for the facial action decoding device is recorded on a computer-readable recording medium PM21 such as the magnetic disc, and is read by the computer at times such as computer start-up and the like and realizes the function units 301, 302, and 31 on the computer by controlling the operation of the computer.

Next, an operation performed by the facial action decoding device according to this embodiment will be described. The controller CNT21 first inputs, by using the 3D face model correlation unit 301, the expressionless face three-dimensional data S300 of a certain person stored in the storage device M21 and used for decoding, and matches a face triangular polygon mesh model S105 previously prepared in the storage device M23 for the inputted data to thereby generate three dimensional expressionless face triangular polygon mesh model S302, and then saves it into the storage device M24. Next, by using the movement amount calculation unit 302, the controller CNT21 calculates, in accordance with the external force information S30 of the expressive action stored in the storage device M22, the movement position of each control point in the action area of the three-dimensional expressionless face triangular polygon mesh model S302 saved in the storage device M24, and then saves it into the storage device M25 as movement position data S303 of the control point. Next, by using the expression creation unit 31, the controller CNT21 deforms, based on the movement position data S303 of the control point saved in the storage device M25, the expressionless faced three-dimensional data S300 stored in the storage device M21, generates three-dimensional data of the expressive action face at expressive action, saves it into the storage device M26 as the expressive face 3D data S32, and also displays it on the display device DPY. Hereinafter, a detailed description will be given.

Used as the external force information S30 of the expressive action stored in the storage device M22 is information corresponding to external force data S12 of the expressive action and the action area S13 of the expressive action which are generated by the facial action encoding device of the fourth embodiment shown in FIG. 18. Used as the face triangular polygon mesh model S105 prepared in the storage device M23 is a model same as that of the face triangular polygon mesh model S105 used in the facial action encoding device of the fourth embodiment shown in FIG. 18.

The three-dimensional face model correlation unit 301 matches the face triangular polygon mesh model S105 with the expressionless face three-dimensional data S300 in the same method as employed by the three-dimensional face model providing unit 101 of the facial action encoding device of the fourth embodiment shown in FIG. 18 to thereby generate the three-dimensional expressionless face triangular polygon mesh model S302. That is, each vertex of each polygon in the face triangular polygon mesh model S105 is allocated with a three-dimensional coordinate of a point of the expressionless face three-dimensional data S300 correlated to this vertex, and then one having the vertexes of all the polygons thereof respectively allocated with three-dimensional coordinates of points of the expressionless face three-dimensional data S300 is saved into the storage device M24 as the three-dimensional expressionless face triangular polygon mesh model S302.

The movement amount calculation unit 302 inputs, from storage device M22, external force information S30 of the expressive action correlated with the face triangular polygon mesh model S105, and calculates the movement position S303 of the control point at expressive action in the same method as employed by the control point action unit 3 of the first embodiment of FIG. 2. For example, when a face triangular polygon mesh model similar to that of the fourth embodiment of FIG. 18 is used, by calculating the aforementioned formula (7) with the element of the aforementioned element (6) as n=3 by using the three-dimensional coordinates of the three vertexes of the polygon and the external forces acting on the vertexes of the polygon described in the external force information S30, the movement position of the vertexes of each polygon at expressive action can be calculated.

Of the points composing the expressionless face 3D data S300 stored in the storage device M21, the movement position of a point correlated with a vertex of a polygon in the action area of the face triangular polygon mesh model S105 has already been calculated with the position data S303; therefore, the expression creation unit 31 calculates the movement position of the other points (points within the polygon) in the same method as employed by the action interpolation unit 4 of the first embodiment of FIG. 2. For example, when a face triangular polygon mesh model is used, the expression creation unit 31 calculates the movement position of a point within each polygon based on the movement position of the vertex by interpolation. Then the expression creation unit 31 generates the expressive face three-dimensional data S32 by modifying the three-dimensional coordinate of each point of the expressionless face 3D data S300 by the movement position of this point.

Note that a vertex of a polygon is usually included in a plurality of different polygons; therefore, a step difference or the like tends to be formed at a boundary portion between adjacent small areas (in this case, polygons) as described in FIG. 10. Thus, it is desirable to resolve the step difference or the like by incorporating in the expression creation unit 31 the same function as that of the adjacent small areas adjustment unit 5 of the second embodiment of FIG. 9. Moreover, the same function as that of the non-action area adjustment unit 6 of the third embodiment of FIG. 14 may be incorporated in the expression creation unit 31 to thereby resolve the step difference or the like occurring at a boundary portion between the action area and then on action area.

In the fifth embodiment of FIG. 23, the expressionless face three-dimensional face S300 of a certain person is deformed based on the external force information S30 of a single expressive action. However, the expressionless face three-dimensional data S300 may also be deformed based on the external force information S30 of a plurality of mutually different expressive action. In this case, the movement amount calculation unit 302 synthesizes the external force information S30 of the plurality of expressive action into one external information by adding together external forces acting on the same control point, and calculates the movement position data S303 of the control point based on this synthesized external force to thereby calculate final movement position data of the control point in accordance with the plurality of external force information S30. Alternatively, after calculating the movement position data S303 of the control point based on the respective external force information S30, the movement amount calculation unit 302 calculates the average of the movement position for the same control point to thereby calculate final movement position data of the control point in accordance with the plurality of external force information S30.

Figure 24:
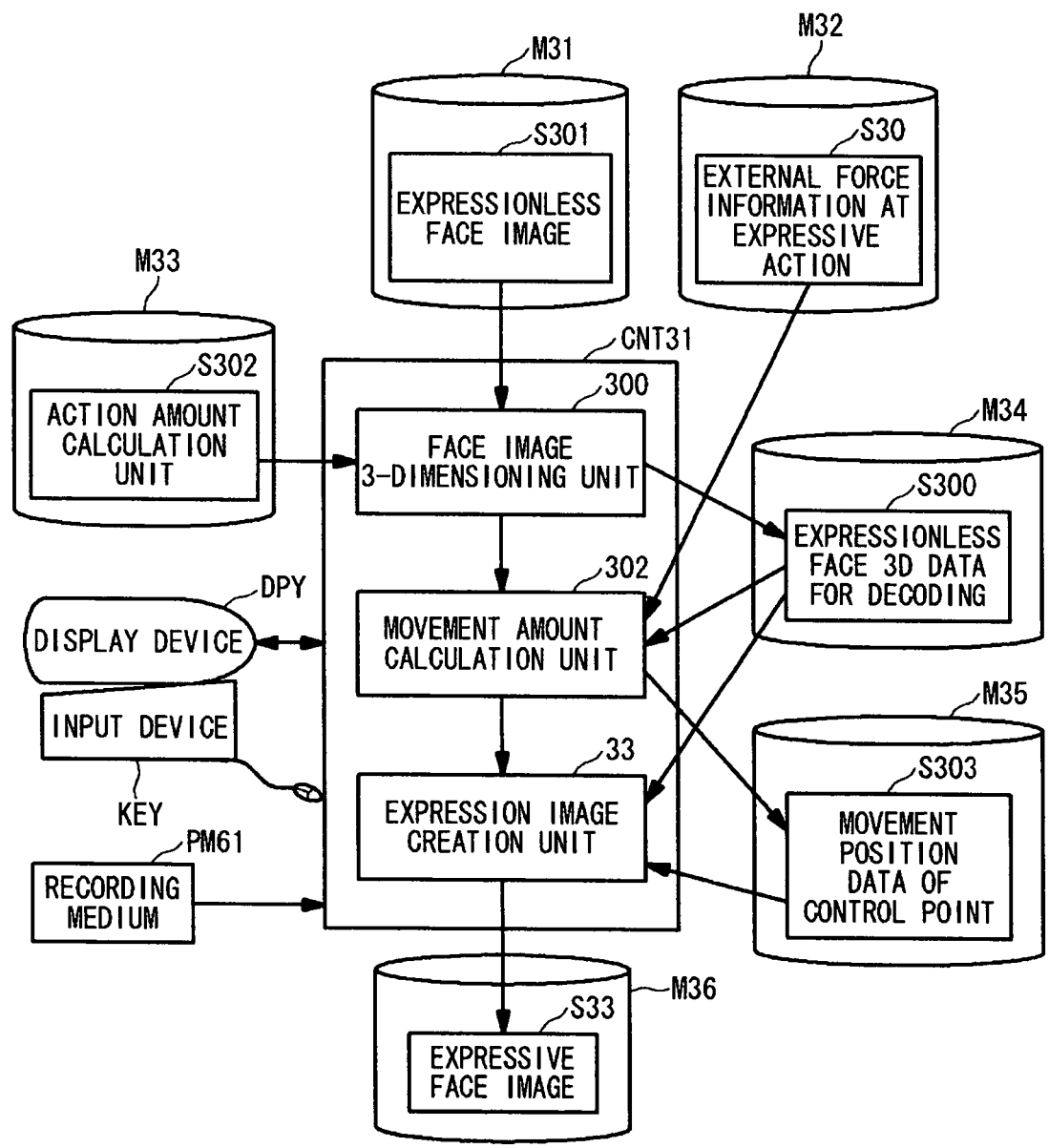
FIG. 24 is a block diagram of a facial action decoding device according to a sixth embodiment of the present invention.

FIG. 24 is a block diagram of the facial action decoding device according to the sixth embodiment of the present invention, which deforms a face image (two-dimensional face image) of a certain person at non-expression based on external force information, generates and outputs the face image (two-dimensional face image) of this person at expressive action. That is, the facial action decoding device of this embodiment replaces the expressionless face three-dimensional data S300 as an input in the facial action decoding device of the fifth embodiment shown in FIG. 23 with an expressionless face image S301 and replaces the expressive face three-dimensional data S32 as an output therein with an expressive face image S32.

The facial action decoding device of this embodiment is composed of: a processor CNT 31, storage devices M31 to M36, display device DPY, and input device KEY. A plurality of storage devices M31 to M36 are each composed of, for example, the magnetic disc. Of these devices, the storage devices M31 and M32 store the expressionless face image S301 and external force information S30 at expressive action as input data, the storage device M36 stores as output data the expressive face image S33, and the other storage devices M33 to M35 store the interim result or control data required in the course of processing. The display device DPY is composed of, for example, the liquid crystal display, and is used for displaying the generated expressive face image S33, data in the course of processing, and the like. The input device KEY is composed of, for example, the keyboard and the mouse, and is used for accepting various kinds of data and instructions from the user. The controller CNT31 is composed of, for example, the central processor of the computer, and executes main processing performed by the facial action decoding device of this embodiment. The controller CNT31 has a face image three-dimensioning unit 300, an movement amount calculation unit 302, and an expression image creation unit 33.

Each of the function units 300, 302, and 33 of the controller CNT31 can be realized by a computer composing the controller CNT31 and a program for the facial action decoding device. The program for the facial action decoding device is recorded on a computer-readable recording medium PM31 such as the magnetic disc, and is read by the computer at times such as computer start-up and the like and realizes the function units 300, 301, and 33 on the computer by controlling the operation of the computer.

Next, an operation performed by the facial action decoding device according to this embodiment will be described. The controller CNT31 first inputs, by using the face image three dimensioning unit 300, the expressionless face image S301 of a certain person stored in the storage device M31 and used for decoding, and attaches it to an expressionless face three-dimensional model S302 previously prepared in the storage device M33 to thereby generate the expressionless face three-dimensional data S300 for decoding, and then saves it into the storage device M34. This saved expressionless face three-dimensional data S300 corresponds to the three-dimensional expressionless face triangular polygon mesh model S302 of the fifth embodiment of FIG. 23. Next, as in the fifth embodiment of FIG. 23, by using the movement amount calculation unit 302, the controller CNT31 calculates, in accordance with the external force information S30 of the expressive action stored in the storage device M32, the movement position of each control point in the action area of the expressionless face three-dimensional data S300 saved in the storage device M34, and then saves it into the storage device M35 as movement position data S303 of the control point. Next, by using the expression image creation unit 33, with the same processing as performed by the expression creation unit 31 of the fifth embodiment of FIG. 23, the controller CNT31 deforms, based on the movement position data S303 of the control point saved in the storage device M35, the expressionless face three-dimensional data S300 stored in the storage device M34 to generate the three-dimensional data of the expressive action face at expressive action, and then generates the expressive face image S33 based on this three-dimensional data, and saves it into the storage device M36 and also displays it on the display device DPY. Hereinafter, a detailed description will be given.

Used as the external force information S30 of the expressive action stored in the storage device M32 is information corresponding to the external force data S12 of the expressive action and the action area S13 of the expressive action which are generated by the facial action encoding device of the fourth embodiment shown in FIG. 18. Used as the expressionless face three dimensional model S302 prepared in the storage device M33 is the three-dimensional model of a certain person using a mesh model same as that of the face triangular polygon mesh model S105 used in the facial action encoding device of the fourth embodiment shown in FIG. 18.

The face image three-dimensioning unit 300 inputs the expressionless face image S301 for decoding and also the expressionless face three-dimensional model S302 and attaches the expressionless face image S301 for decoding to the expressionless face three-dimensional model S302 to thereby create the expressionless face 3D data S300 for decoding. As an example of this attachment method, an expressionless three-dimensional data of a particular person is registered as a face three-dimensional model, a feature point of this face model is correlated with a feature point of the expressionless face image S301 for decoding, and correlation is provided for those other than the feature points based on the positional relationship with the feature points by interpolation or extrapolation as shown in FIG. 7. Providing this correlation permits treating, as the expressionless face three-dimensional face data S300 for decoding, the one accompanied with the expressionless face image S301 for decoding as texture information of the face three-dimensional model S302. The expressionless face three-dimensional data S302 of the above particular person does not have to be a face of an actually existing person, but may be something like an average face obtained by averaging the expressionless face three-dimensional data of the actual persons. As another embodiment of this attachment method, a face mesh model having part of vertexes of a triangular mesh as shown in FIG. 19 correlated with facial feature points is used as the expressionless face three-dimensional model S302. As can be seen from FIG. 19, such a three-dimensional coordinate that imitates the three-dimensional shape of a face is provided to each vertex of the triangular mesh. This face mesh model can be recognized as face three-dimensional data with very rough expression that is provided artificially. The expressionless face image S301 for decoding and the face mesh model are correlated to each other in units of feature points, correlation is provided for those other than feature points by interpolation or extrapolation as shown in FIG. 7, and the expressionless face three-dimensional data S300 for decoding is created in the same manner as employed for the expressionless face three-dimensional data.

The expression image creation unit 33 creates, in the same manner as employed by the expression creation unit 31 of the fifth embodiment, expressive action face three-dimensional data at decoding to be outputted, and then projects this face three-dimensional data on a specified view to generate the expressive action face image S33 at decoding and output it to the storage device M36.

In the sixth embodiment of FIG. 24, the expressionless face image S301 of a certain person is deformed based on the external force information S30 of the single expressive action. However, as is described in the fifth embodiment of FIG. 23, the expressionless face image S301 may also be deformed based on the external force information S30 of a plurality of mutually different expressive actions.

In the fifth embodiment, the expressionless face three-dimensional data S300 is defined as the input and the expressive action face three-dimensional data S32 is defined as the output. In the sixth embodiment, the expressionless face image S301 is defined as the input and the expressive action face image S33 is defined as the output. Other possible embodiments provide a facial action decoding device having expressionless face three-dimensional data S300 defined as the input and expressive action face image S33 defined as the output and a facial action decoding device having expressionless face image S301 defined as the input and expressive action face three-dimensional data S32 defined as the output.

Figure 25:
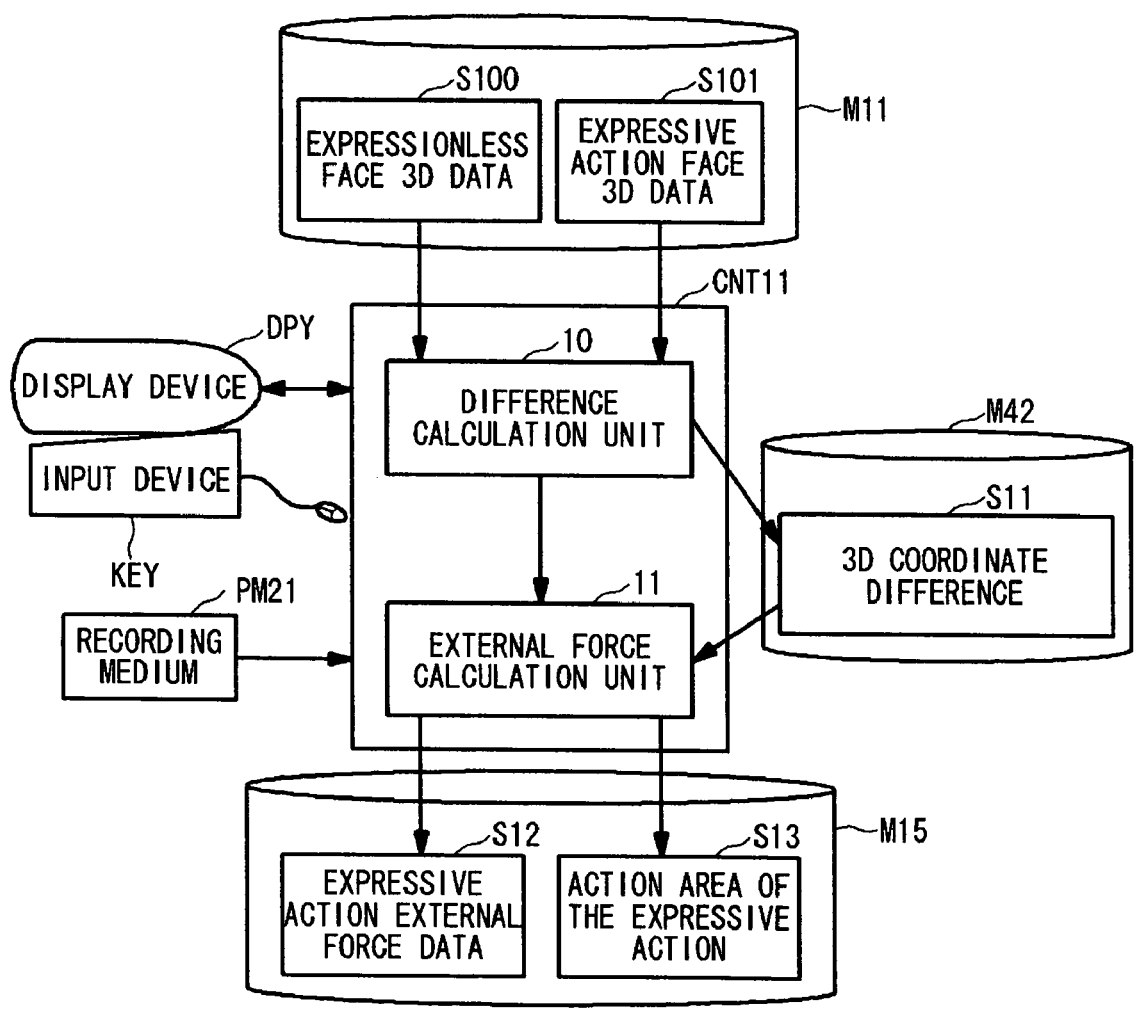
FIG. 25 is a block diagram of a facial action encoding device according to a seventh embodiment of the present invention.

FIG. 25 is a block diagram of the facial action encoding device according to the seventh embodiment, which calculates and outputs the action area and the external force based on the three-dimensional data of a certain person at non-expression and at expressive action, as similar to the fourth embodiment. The facial action encoding device of this embodiment includes a processor CNT 41, storage devices M41 to M43, display device DPY, and input device KEY. A plurality of storage devices M41 to M43 are each composed of, for example, the magnetic disc. Of these devices, the storage device M41 stores expressionless face 3D data S100 and expressive action face 3D data S101 as input data, the storage device M43 stores the external force data S12 of the expressive action and the action area S13 of the expressive action as output data, and the other storage device M42 stores the control data required for the interim results or in the course of processing. The display device DPY is composed of, for example, the liquid crystal display, and is used for displaying data in the course of processing and the like. The input device KEY is composed of, for example, the keyboard and the mouse, and is used for accepting various kinds of data and instructions from a user. The controller CNT 41 is composed of, for example, the central processor of the computer, and executes main processing performed by the facial action encoding device of this embodiment. The controller CNT41 has a difference calculation unit 10 and an external force calculation unit 11.

Each of the function units 10 and 11 of the controller CNT41 can be realized by the computer composing the controller CNT41 and a program for the facial action encoding device. The program for the facial action encoding device is recorded on a computer-readable recording medium PM41 such as the magnetic disc, and is read by the computer at times such as computer start-up and the like and achieves the function units 10 and 11 on the computer by controlling the operation of the computer.

Next, the operation performed by the facial action encoding device according to this embodiment will be described. The controller CNT41 first inputs, by using the difference calculation unit 10, the expressionless face three-dimensional data S100 and the expressive action face three-dimensional data S101 of a person stored in the storage device M11 and used for encoding, and generates a three-dimensional coordinate difference S11 based on these inputted data, and then saves it into the storage device M42. The details of the processing performed by the difference calculation unit 10 is as described below.

The difference calculation unit 10 correlates the same portions of the expressionless face three-dimensional data S100 and the expressive action face three-dimensional data S101 (for example, the tail of the right eye of the expressionless face and the tail of the right eye of expressive action face, or the like). The correlation may be automated with the aforementioned marker or the like as a clue or may be provided manually by the user using the GUI tool while displaying the both images on the display device DPY. Since it is difficult in practice to provide correlation for all the points, it is appropriate that only a portion with a marker and feature portions such as eyes, the mouth, the nose, and the like be provided with correlation while other portions are correlated with feature portions at relative position by a method such as linear interpolation. After correlation is provided, a difference in a three-dimensional coordinate between correlated points of the expressionless face three-dimensional data S100 and the expressive action face three-dimensional data S101 is calculated. Next, an area whose norm of difference in the three-dimensional coordinate, that is, the distance, is equal to or larger than a predetermined threshold value or an area with limitations such as the one with muscles of expression provided to the action are defined as action areas at expression, and other areas are defined as non-action areas. Then, for a point belonging to the action area (action point), the position of the expressionless face three-dimensional data (three-dimensional coordinate or a two-dimensional coordinate on a coordinate on a two dimensional surface, such as a cylinder or the like, where this three-dimensional coordinate is projected) and the three-dimensional coordinate difference thereof are outputted as three-dimensional coordinate difference S11.

The external force calculation unit 11 calculates, for the action point only, by using the three-dimensional coordinate difference S11 stating the position of the expressionless face three-dimensional data and the three-dimensional coordinate difference thereof, an external force required for moving the position of this action point from the position of the expressionless face three-dimensional data by an amount of the three-dimensional coordinate difference, and outputs it as the external force data S12 of the expressive action, and also outputs action area S13 where the external force acts to thereby cause an expressive action. The action area S13 is divided into small areas which, under the external force acting on three or more control points connected to each other with the springs and the dampers as described in FIG. 1, are drawn by the control points to thereby integrally move, and thus the actions of the respective small areas become the action of the entire action area. The dynamics system in each small area can be formulated as described above under the assumption that all the springs and dampers have the same spring constant and damper constant.

Figure 26:
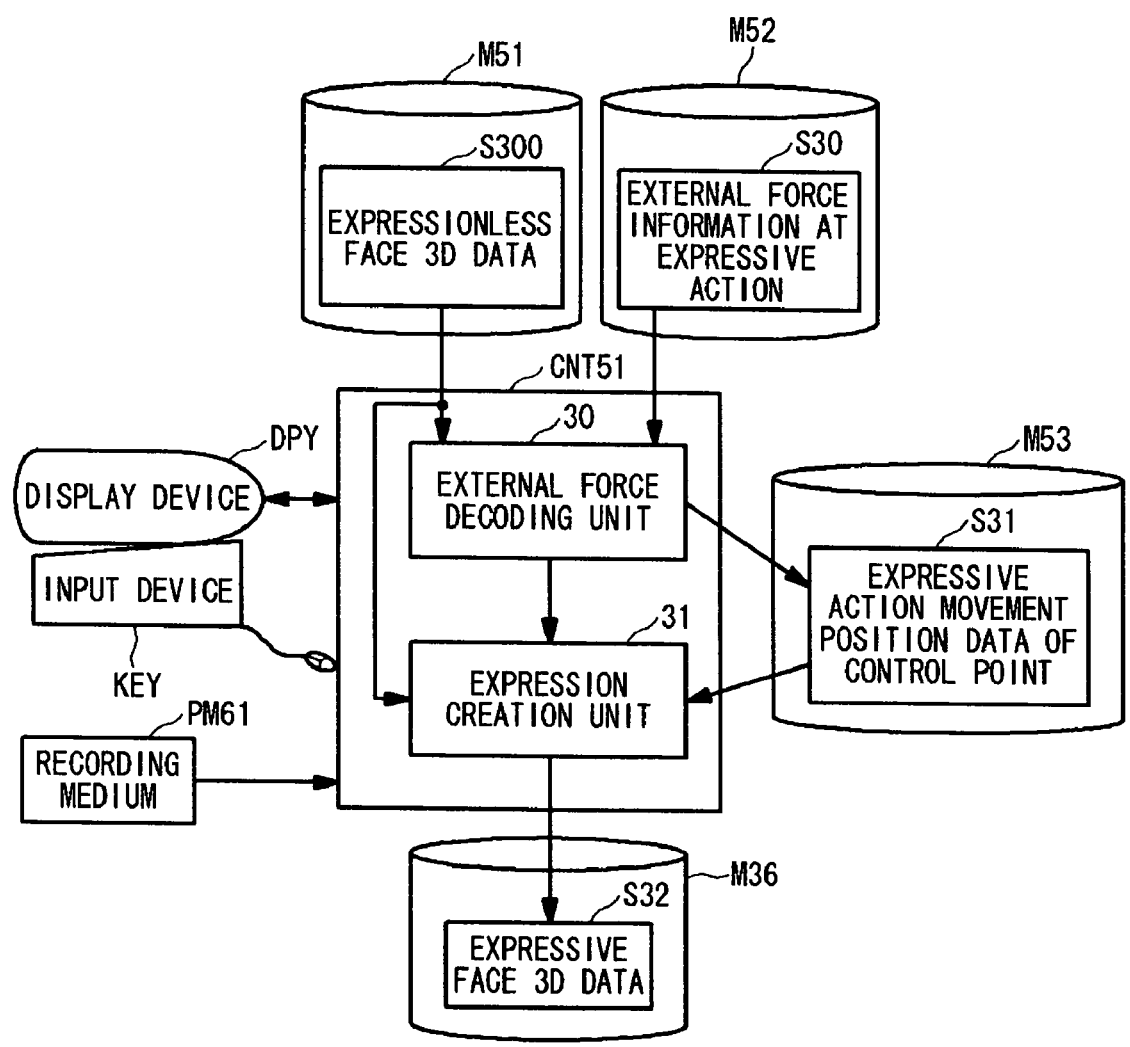
FIG. 26 is a block diagram of a facial action decoding device according to an eighth embodiment of the present invention.

FIG. 26 is a block diagram according to the eighth embodiment of the present invention, the embodiment of the present invention applied to the facial action decoding device which, as similar to the fifth embodiment of FIG. 23, deforms expressionless face three-dimensional data of a certain person at non-expression based on external force information of the certain person at expressive action, and generates and outputs the face three-dimensional data of this person at expressive action. The facial action decoding device of this embodiment is composed of a processor CNT 51, storage devices M51 to M54, the display device DPY, and the input device KEY. A plurality of storage devices M51 to M54 are each composed of, for example, the magnetic disc. Of these devices, the storage devices M51 and M52 store the expressionless face 3D data S300 and the external force information S30 of the expressive action as input data, the storage device M54 stores the expressive face 3D data 32 as output data, and the other storage device M53 stores the control data required for the interim results. The display device DPY is composed of, for example, the liquid crystal display, and is used for displaying the generated expressive face 3D data S32, data in the course of processing, and the like. The input device KEY is composed of, for example, the keyboard and the mouse, and is used for accepting various kinds of data and instructions from the user. The controller CNT51 is composed of, for example, the central processor of the computer, and executes main processing performed by the facial action decoding device of this embodiment. The controller CNT51 has an external force decoding unit 30 and an expression creation unit 31.

Each of the function units 30 and 31 of the controller CNT51 can be achieved by the computer composing the controller CNT51 and a program for the facial action encoding device. The program for the facial action decoding device is recorded on the computer-readable recording medium PM51 such as the magnetic disc, and is read by the computer at times such as computer start-up and the like and realizes the function units 30 and 31 on the computer by controlling the operation of the computer.

Next, an operation performed by the facial action decoding device according to this embodiment will be described. The controller CNT51 first inputs the expressionless face three-dimensional data S300 stored in the storage device M51 and the external force information S30 of the expressionless action stored in the storage device M52 by using the external force decoding unit 30.

Here, the external force information S30 of the expressionless action is information obtained by integrating together the external force data S12 of the expressive action and action area S13 of the expressive action in the seventh embodiment of FIG. 25. More specifically, the action area S13 is saved as an area described by relative position referring to the position and distance of a feature point, such as an area indicating part of the face, both eyes, an oral slit point, or the like. As a possible saving format, the face surface is projected on a plane surface, a cylinder, a sphere, or the like and is saved as a two-dimensional coordinate. Moreover, in the present invention, since the action area is divided into small areas, the action area is also divided into small areas on the two-dimensional coordinate. This can be more understood by comparing the earth with a face, part of the continent on the earth with the action area, a country within this continent with a small are, and the world map with the projection plane of the action area. The small areas are numbered for creating a set of control points. As the external force data S12, a three-dimensional vector of an external force acting on a control point of a small area, a number provided to the small area, and the position of the control point on the same two-dimensional coordinate as the action area are saved.

The external force decoding unit 30 generates, as shown below for example, expressive action movement position data S31 of a control point from the expressionless face three-dimensional data S300 and the external force information S30 of the expressionless action and saves it into the storage device M53. First, the external force decoding unit 30 expands the expressionless face three-dimensional data S300 into a format described by the relative position referring to the positions and distances of a facial feature points, as is the case with the action area of the external force information S30. Next, the external force decoding unit 30 searches on the expanded format a portion corresponding to the action area of the external force information S30, and defines this portion as the action area of the expressionless face three-dimensional data S300. For a small area and a control point, in the same manner, an area and a point correlated with an area and a point of the expressionless face three-dimensional data S300 are searched. In this processing, displaying the expressionless face three-dimensional data S300 on the display device DPY and then providing correlation with a small area and a control point described in the external force information 30 may be performed manually by the user using the tool such as the GUI or the like or may be performed automatically based on the feature point. Once the control point correlated with that of the expressionless face three-dimensional data S300 is found, the external force decoding unit 30 allocates the three-dimensional coordinate of this point to $x_i(0)$ in the formula (7). In addition, the external force decoding unit 30 reads an external force of this control point (correlated point) from the external force information S30, and defines it as the external force $F_i$ in the formula (7). After performing this processing for all the control points, the external force decoding unit 30 provides the parameter d and t indicating the strength of expressive action and calculates a three-dimensional position $x_i(t)$ of the control point after the expressive action from the formula (7) with a set of control points having the same small area number of the external force information 30. The three-dimensional position information of the control point after this movement and position information on the above format of the action area, the small area, the control point in the expressionless face three-dimensional data S300 for position decoding are defined as expressive action movement position S31 of the control point.

The expression creation unit 31 moves the control point of the expressionless face three-dimensional data S300 to the position shown by the expressive action movement position S31, and calculates three-dimensional coordinate of the movement position for other points by interpolation, extrapolation based on the position relative to the control point belonging to the same small area, and moves the correlated position in the expressionless face three-dimensional data S300 to this movement position. When all the points with in the action area are moved, expressive action face three-dimensional data S32 is completed. The expressive action face three-dimensional S32 becomes a three-dimensional face data provided with color information if the expressionless face three-dimensional data S300 used for decoding is accompanied with a texture. As is the case with the expression creation unit 31 of the fifth embodiment shown in FIG. 23, the same function as that of the adjacent small areas adjustment unit 5 of FIG. 9 may be incorporated in the expression creation unit 31 to resolve a step difference or the like at a boundary portion between small areas, and also the same function as that of the non-action area adjustment unit 6 of FIG. 14 may be incorporated in the expression creation unit 31 to resolve the step difference or the like occurring at the boundary portion between the action area and the non-action area.

In the eighth embodiment of FIG. 26, the face three-dimensional data S300 of a certain person at non-expression is deformed based on the external information S30 of a single expressive action. However, the expressionless face three-dimensional data S300 may also be deformed based on external force information S30 of a plurality of respectively different expressive actions. In this case, the external force decoding unit 30 synthesizes the external force information S30 of a plurality of expressive actions into one external force information by adding together external forces acting on the same control point, and calculates the expressive action movement position data S31 of the control point based on this synthesized external force to thereby calculates expressive action movement position data of the final control point in accordance with a plurality of external force information S30, or the external force decoding unit 30 first calculates the expressive action movement position data S31 of the control point based on the respective external force information S30 and then obtains the average of the movement position concerning the same control point to thereby calculate the expressive action movement position data of the final control point in accordance with the plurality of external force information S30.

Figure 27:
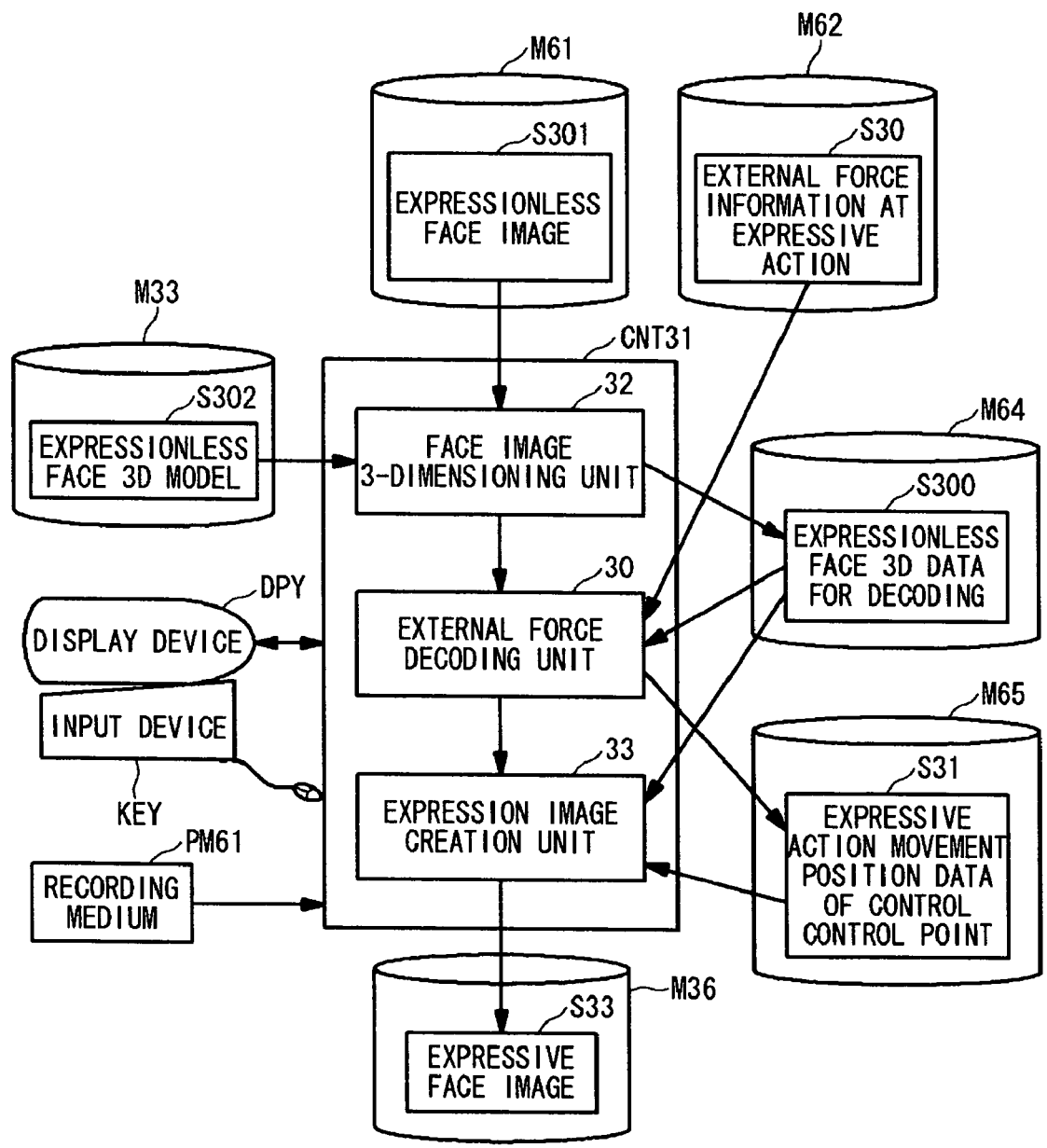
FIG. 27 is a block diagram of a facial action decoding device according to a ninth embodiment of the present invention.

FIG. 27 is a block diagram according to the ninth embodiment of the present invention, showing the embodiment of the present invention applied to the facial action decoding device which deforms a face image (two-dimensional image) of a certain person at non-expression based on external force information at expressive action and generates and outputs the face image (two-dimensional face image) of the person at expressive action. That is, the facial action decoding device of this embodiment replaces the expressionless face three-dimensional data S300 as the input in the facial action decoding device of the eighth embodiment shown in FIG. 26 with an expressionless face image S301 and replaces the expressive face three-dimensional data S32 as the output therein with the expressive face image S32.

The facial action decoding device of this embodiment is composed of a processor CNT 61, storage devices M61 to M66, display device DPY, and input device KEY. A plurality of storage devices M61 to M66 are each composed of, for example, the magnetic disc. Of these devices, the storage devices M61 and M62 store the expressionless face image S301 and the external force information S30 of the expressive action as input data, the storage device M66 stores the expressive face image 33 as output data, and the other storage devices M63 to 65 store the interim results or the control data required in the course of processing. The display device DPY is composed of, for example, the liquid crystal display, and is used for displaying the generated expressive face image S33, data in the course of processing, and the like. The input device KEY is composed of, for example, the keyboard and the mouse, and is used for accepting various kinds of data and directions from the user. The controller CNT61 is composed of, for example, the central processor of the computer, and executes main processing performed by the facial action decoding device of this embodiment. The controller CNT61 has a face image three-dimensioning unit 32, external force decoding unit 30, and expression image creation unit 33.

Each of the function units 32, 30, and 33 of the controller CNT61 can be realized by the computer composing the controller CNT61 and a program for the facial action decoding device. The program for the facial action decoding device is recorded on a computer-readable recording medium PM61 such as the magnetic disc, and is read by the computer at times such as computer start-up and the like and realizes the function units 32, 30, and 33 on the computer by controlling the operation of the computer.

Next, an operation performed by the facial action decoding device according to this embodiment will be described. The controller CNT61 first inputs, by using the face image three-dimensioning unit 32, the expressionless face image S301 of a certain person stored in the storage device M61 and used for decoding, and then attaches it to an expressionless face three-dimensional model S302 previously prepared in the storage device M63 to thereby generate the expressionless face three dimensional data S300 for decoding, and saves it into the storage device M64. Next, by using the external force decoding unit 30 as in the eighth embodiment of FIG. 26, the controller CNT61 calculates, in accordance with the external force information S30 of the expressive action stored in the storage device M62, the movement position of each control point in the action area in the expressionless face three-dimensional data S300 for decoding saved in the storage device M64, and then saves it into the storage device M65 as expressive action movement position data S31 of the control point. Next, by using the expression image creation unit 33, by the same processing as that of the expression creation unit 31 of the eighth embodiment of FIG. 26, the controller CNT61 deforms, based on the expressive action movement position data S31 of the control point saved in the storage device M65, the expressionless face three-dimensional data S300 for decoding stored in the storage device M64 to thereby generate three-dimensional data of the expressive action face at expressive action, and then projects this three-dimensional data on a specified view to thereby generate the expressive action face image S33, and outputs it to the storage device M36.

In the eighth embodiment, the expressionless face three-dimensional data S300 is defined as the input and the expressive action face three-dimensional data S32 is defined as the output. In the ninth embodiment, the expressionless face image S301 is defined as the input and the expressive action face image S33 is defined as the output. However, other possible embodiments provide a facial action decoding device having the expressionless face three-dimensional data S300 defined as the input and the expressive action face image S33 defined as the output and a facial action decoding device having the expressionless face image S301 defined as the input and the expressive action face three-dimensional data S32 defined as the output.

In the ninth embodiment of FIG. 27, the expressionless face image S301 of the certain person is deformed based on the external force information S30 of a single expressive action. However, in the same method as described in the eighth embodiment of FIG. 26, the expressionless face image S301 can also be deformed based on the external force information S30 of a plurality of mutually different expressive actions.

Figure 28:
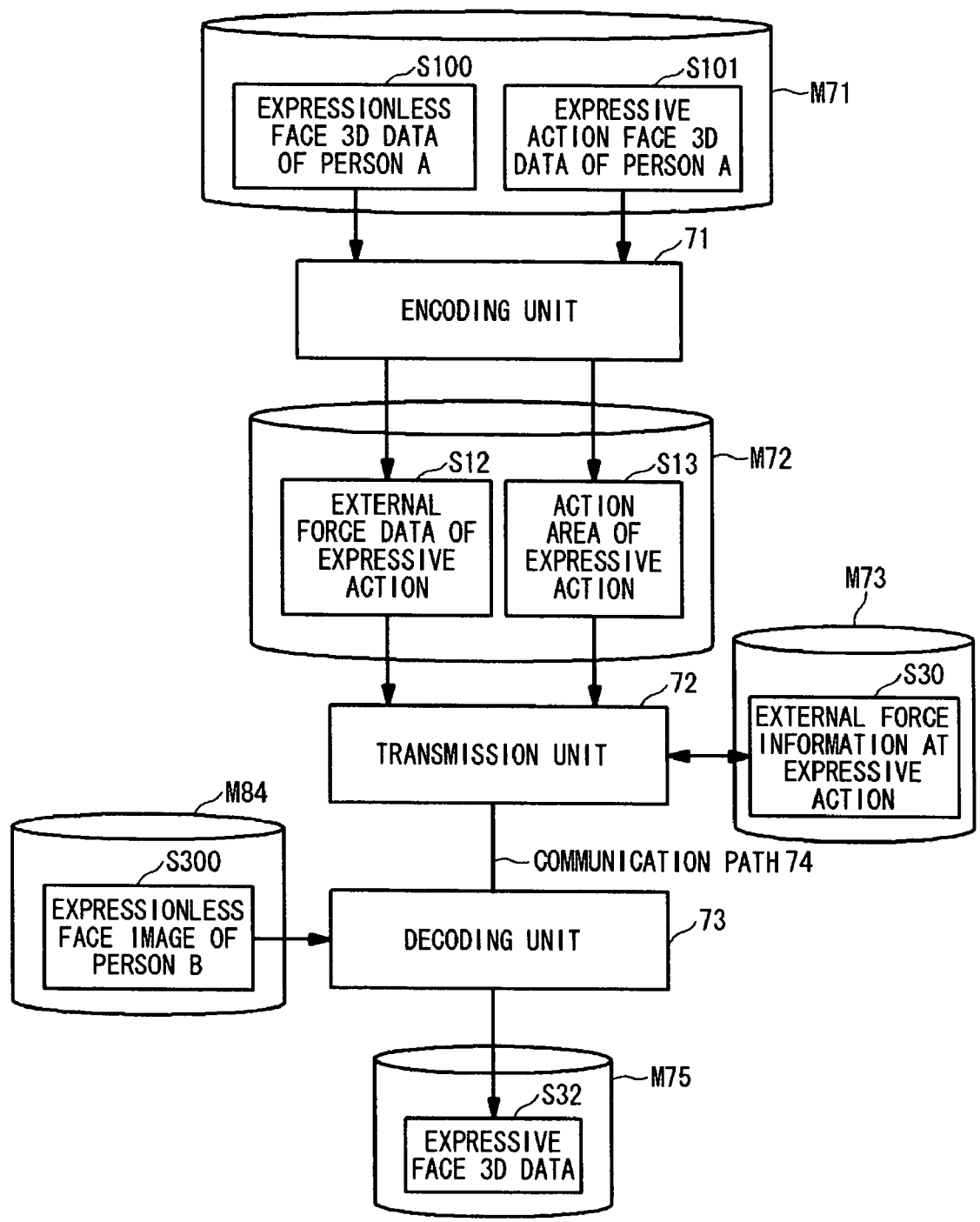
FIG. 28 is a block diagram of a facial action encoding-decoding device according to a tenth embodiment of the present invention.

FIG. 28 is a block diagram of the facial action encoding-decoding device according to the tenth embodiment of the present invention, which provides, from a set of three-dimensional data of a certain person A at non-expression and at expressive action, an expressive movement to expressionless face three-dimensional data of a different person B.

The facial action encoding-decoding device of this embodiment includes an encoding device 71, a transmission device 72, and a decoding device 73. The transmission device 72 and the decoding device 73 are communicatably connected together via a communication path 74. In addition, the facial action encoding-decoding device includes: a storage device M71 that stores the expressionless face three-dimensional data S100 of a person A and the expressive action face three-dimensional data S101 of the person A as input data of the decoding device 71; a storage device M72 that stores the external force data S12 of the expressive action and the action area S13 of the expressive action generated at the decoding device 71; a storage device M73 that temporarily saves the external force information S30 of the expressive action created by integrating together the external force data S12 of the expressive action and the action area S13 by the transmission device 72; a storage device M74 that stores the expressionless face three-dimensional data S300 of the person B; and a storage device M75 that saves expressive face three-dimensional data S32 of the person B generated at the decoding device 73 based on the external force information S30 of the expressive action transmitted from the transmission device 72 via the communication path 74 and the expressionless face three-dimensional data S300 of the person B stored in the storage device M74.

The encoding device 71 can be realized by the facial action encoding device of the seventh embodiment shown in FIG. 25. That is, the encoding device 71 can be composed of the processor CNT41 having the difference calculation unit 10 and the external force calculation unit 11, the storage device M42, the display device DPY, and the input device KEY of FIG. 25. Therefore, the operation performed by the encoding device 71 is the same as the operation performed by the facial action encoding device of the seventh embodiment.

The transmission device 72 transfers the external force data S12 of the expressive action and the action area S13 of the expressive action to the decoding device 73 and also controls this transfer. The action area S13 is saved as an area described by relative position referring to the position and the distance of an area indicating part of the face or a feature point such as both eyes, oral slit point, or the like. As a possible saving format, the face surface is projected on a plane surface, a cylinder, a sphere, or the like and is saved as a two-dimensional coordinate. Since the action area is divided into small areas, the action area is also divided into small areas on the two-dimensional coordinate. The small areas are numbered for creating a set of control points. As the external force data S12, a three-dimensional vector of external force acting on the control point of the small area, a number provided to the small area, and the position of the control point on the same two-dimensional coordinate as the action area are saved. Note that the entire action area and small area do not have to be transmitted, and thus only the contours thereof may be transmitted. As a transmission method, simple and direct transmission may be performed, or lossless encoding may be first performed and then transmission may be performed so that decoding is performed on the reception side. To the decoding device 73, the external force information S30 integrating the external force data S12 and the action area S13 thereof is transmitted.

As a function of the transmission device 72, there is processing performed at creation of an asymmetric expressive action. The asymmetric expressive action is to create a plurality of expressive actions on the encoding side, to transmit them simultaneously to the decoding device 73 by the transmission device 72, and to create at the decoding device 73 an expressive action mixing together the plurality of the expressive actions. In this case, it is required to accumulate information of the external force information S30 for the plurality of expressive actions.

The decoding device 73 can be realized by the facial action decoding device of the eighth embodiment shown in FIG. 26. That is, the decoding device 73 can be composed of: the processor CNT51 having the external force decoding unit 30 and the expression creation unit 31, the storage device M53, the display device DPY, and the input device KEY of FIG. 26. Therefore, an operation performed by the decoding device 73 is the same as the operation performed by the facial action decoding device of the eighth embodiment.

In the above description, the facial action encoding device of the seventh embodiment shown in FIG. 25 is used as the encoding device 71, and the facial action decoding device of the eighth embodiment shown in FIG. 26 is used as the decoding device 73. However, an embodiment is possible such that the facial action encoding device of the fourth embodiment shown in FIG. 18 is used as the encoding device 71, and the facial action decoding device of the fifth embodiment shown in FIG. 23 is used as the decoding device 73.

Figure 29:
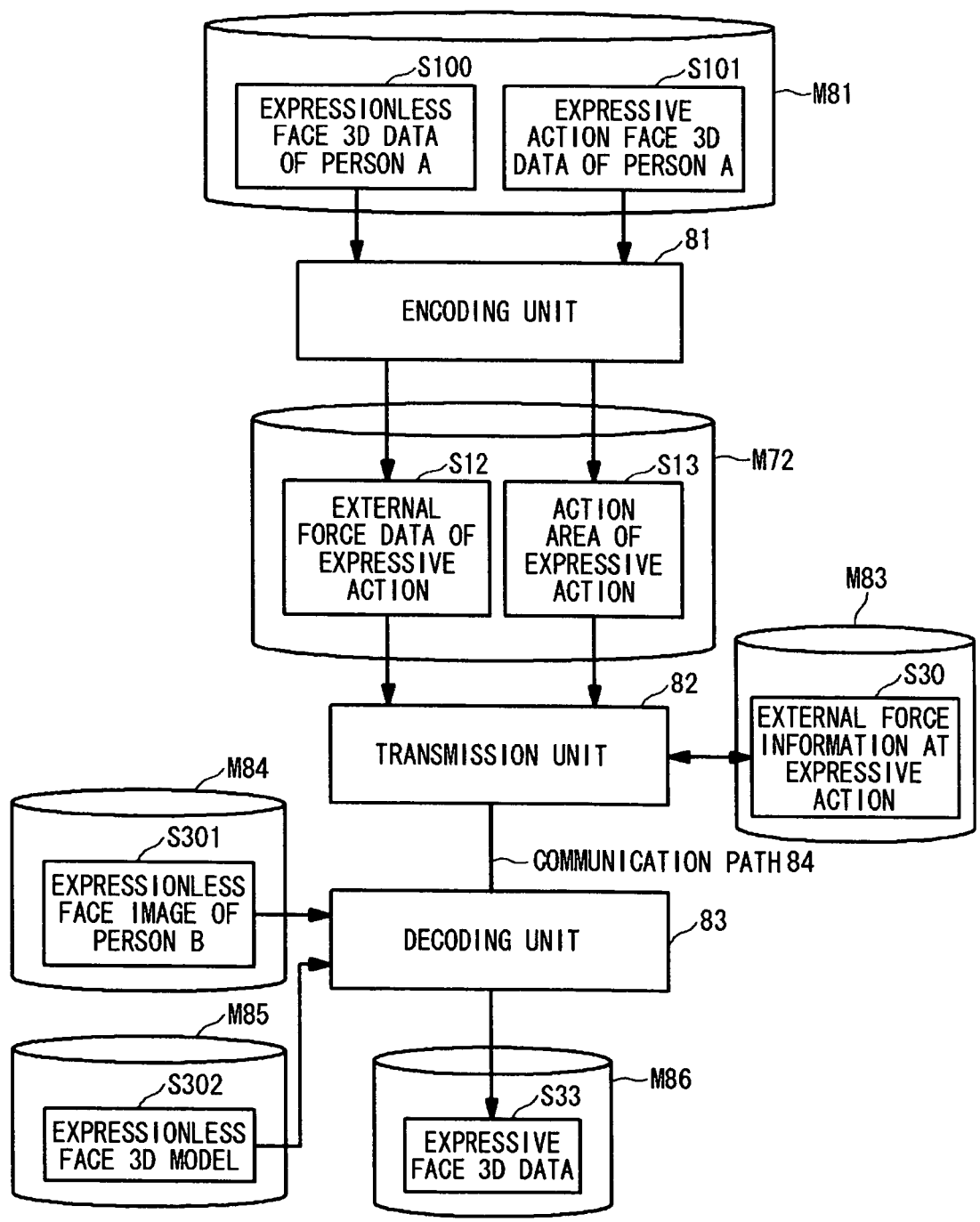
FIG. 29 is a block diagram of a facial action encoding-decoding device according to an eleventh embodiment of the present invention.

FIG. 29 is a block diagram of the facial action encoding-decoding device according to the eleventh embodiment of the present invention, which, from a set of three-dimensional data of a certain person A at non-expression and at expressive action, provides the expressive action to the expressionless face image of a person B. That is, the facial action encoding-decoding device of this embodiment replaces the expressionless face three-dimensional data S300 as the input of the encoding device in the facial action encoding-decoding device of the tenth embodiment shown in FIG. 28 with the expressionless face image S301 and replaces the expressive face three-dimensional data S32 as the output therein with the expressive face image S32.

The facial action encoding-decoding device of this embodiment includes an encoding device 81, a transmission device 82, and a decoding device 83. The transmission device 82 and the decoding device 83 are communicatably connected together via a communication path 84. In addition, the facial action encoding-decoding device includes: a storage device M81 that stores the expressionless face three-dimensional data S100 of the person A and the expressive action face three-dimensional data S101 of the person A as input data of the decoding device 81; a storage device M82 that stores the external force data S12 of the expressive action and action area S13 of the expressive action generated at the decoding device 81; a storage device M83 that temporarily saves the external force information S30 of the expressive action created by integrating together the expressive action face external force data S12 and the action area S13 by the transmission device 82; a storage device M84 that stores of expressionless face image S301 of the person B; and a storage device M85 that stores an expressionless face three-dimensional model S302; a storage device M 86 that saves expression face image S33 of the person B generated at the decoding device 83 based on the external force information S30 of the expressive action transmitted from the transmission device 82 via the communication path 84, the expressionless face image S301 of the person B stored in the storage device M84, and the expressionless three-dimensional model S302 of the person B stored in the storage device M85.

The encoding device 81 and the transmission device 82 are the same as the encoding device 71 and the transmission device 72 of the tenth embodiment shown in FIG. 28. Therefore, the encoding device 81 can be realized by the facial action encoding device of the seventh embodiment shown in FIG. 25. On the other hand, the decoding device 83 can be realized by the facial action decoding device of the ninth embodiment shown in FIG. 27. That is, the decoding device 83 can be composed of the processor CNT61 having the face image three-dimensioning unit 32, the external force decoding unit 30, and the expressive image creation unit 33; the storage devices M63 to 65, the display device DPY, and the input device KEY. Therefore, the operation performed by the decoding device 83 is the same as the operation performed by the facial action decoding device of the ninth embodiment.

In the above description, the facial action encoding device of the seventh embodiment shown in FIG. 25 is used as the encoding device 81, and the facial action decoding device of the ninth embodiment shown in FIG. 27 is used as the decoding device 83. However, an embodiment is possible such that the facial action encoding-decoding device of the fourth embodiment shown in FIG. 18 is used as the encoding device 81, and the facial action decoding device of the sixth embodiment shown in FIG. 24 is used as the decoding device 83.

In the tenth embodiment, the decoding device 73 is provided which has the expressionless face three-dimensional data S300 defined as the input and the expressive action face three-dimensional data S32 defined as the output. In the eleventh embodiment, the decoding device 83 is provided which has the expressionless face image S301 defined as the input and the expressive action face image S33 defined as the output. However, other possible embodiments provide a facial action encoding-decoding device having the expressionless face three-dimensional data S300 defined as the input and the expressive action face image S33 defined as the output and a facial action encoding-decoding device having the expressionless face image S301 defined as the input and the expressive action face three-dimensional data S32 defined as the output.

Figure 30:
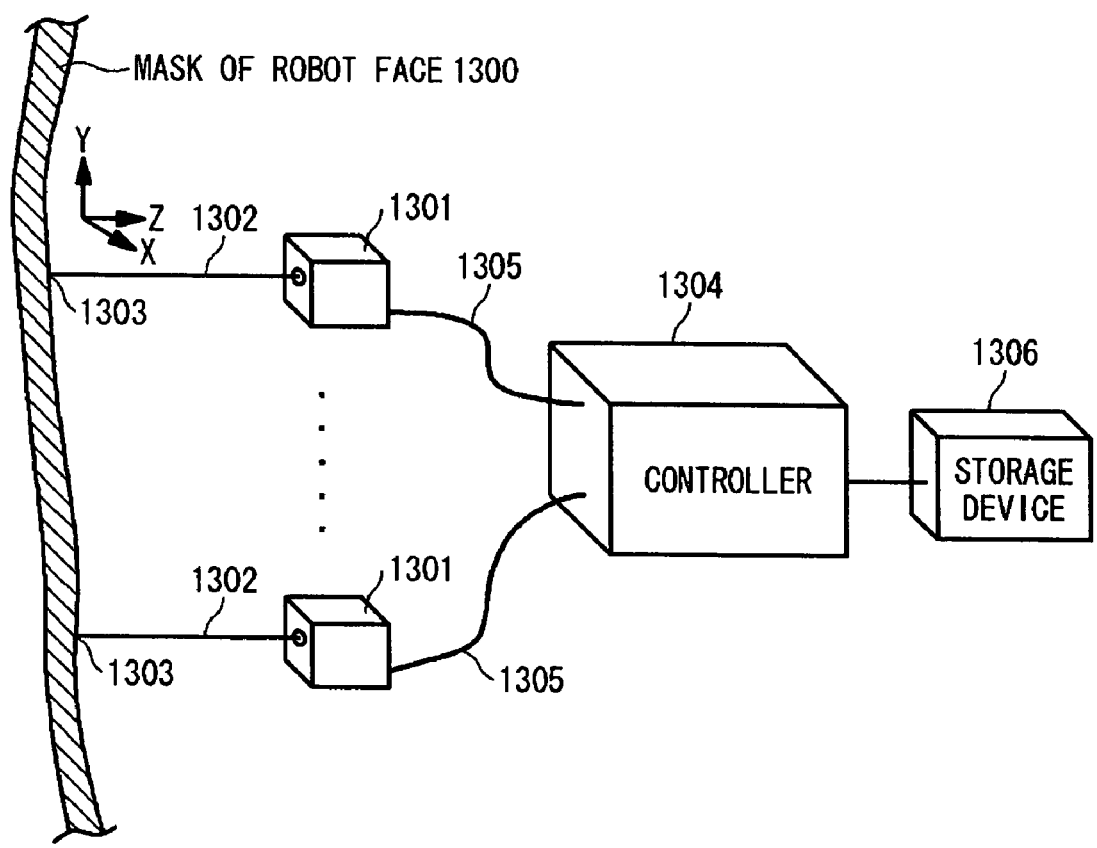
FIG. 30 is a block diagram of a robot controller according to a twelfth embodiment of the present invention.

In the embodiments described above, an expression is provided to a face by deforming the face image or the face three-dimensional data by use of computer graphics technology. In this embodiment, however, an expression is provided to a face by fitting the head of a robot with a mask having flexibility and then deforming the shape of this mask. FIG. 30 shows an example of the structure of a controller built in the head of the robot. In FIG. 30, a numeral 1300 denotes a cross section of the mask fitted to the head of the robot. To the rear surface of the mask 1300, an end portion 1303 of a movable piece 1302 of a three-dimensional actuator 1301 is fitted for each control point in each action area. This end portion 1303 is so set as to be initially located at the position at non-expression. The three-dimensional actuators 1301 are connected together with a controller 1304 and signal lines 1305. In accordance with the movement position signal provided from the controller 1304 via the signal line 1305, the XYZ coordinate position of the end portion 1303 of movable piece 1302 is changed. The end portion 1303 of the movable piece 1302 is fixed to the control point on the rear surface of the mask. Thus, when the position of end portion 1303 moves, each control point of the mask 1300 moves integrally with its surrounding portion, whereby the mask is deformed to display a desired expression. In this condition, the surrounding area of each control point moves while being drawn by the control point; therefore, smoothing a boundary portion between adjacent small areas and smoothing a boundary portion between the action area and the non-action area are not required especially.

The XYZ coordinate position of each control point after movement is stored in a storage device 1306. The XYZ coordinate position of each control point stored into this storage device 1306 is calculated in the same manner as in the first, fifth, sixth, eighth, and ninth embodiments described above. That is, the storage device 1306 corresponds to the storage device M5 in the first embodiment shown in FIG. 2, the storage device M25 in the fifth embodiment shown in FIG. 23, the storage device M35 in the sixth embodiment shown in FIG. 24, the storage device M53 in the eighth embodiment shown in FIG. 26, and the storage device M65 in the ninth embodiment shown in FIG. 27. The controller 1304 can be realized by the computer and the program for the controller.

The embodiments of the present invention have been described above. However, the present invention is not limited to these embodiments; therefore, other various additions and modifications are possible. For example, as an object undergoing shape change with time, the human face and the robot face are exemplified. The present invention is also applicable to an arbitrary object, such as the face of a dog or a cat, which undergoes shape change with time.

The invention claimed is:

1. A shape deformation encoding device comprising:
a calculation unit configured to calculate a difference data between a pre-deformation shape data which represents a shape of an object before shape change and a post-deformation shape data which represents a shape of an object after shape change; and
a determination unit configured to determine an action area on which said shape change of said object is arisen and an external force which is acted to said action area for said shape change, based on said pre-deformation shape data and said difference data.

2. The shape deformation encoding device according to claim 1,
wherein said action area includes a plurality of small areas, each of said plurality of small areas includes a plurality of control points, and
a physical model structure in which said plurality of control points are connected together with springs and dampers as a physical model structure for obtaining said external force.

3. The shape deformation encoding device according to claim 2, wherein said calculation unit includes:
a transformation unit transforming said pre-deformation shape data and said post-deformation shape data into a pre-deformation shape model data and post deformation shape model data; and
a difference calculation unit calculating said difference data from a difference between said pre-deformation shape model data and said post-deformation shape model data.

4. The shape deformation encoding device according to claim 3,
wherein said model is a three-dimensional polygon mesh model, and said pre-deformation shape data and said post-deformation shape data are three-dimensional data.

5. The shape deformation encoding device according to claim 2,
said external force is calculated as an external force required to deform said plurality of small areas from before to after said shape change independently based on said physical model structure of each of said plurality of small areas.

6. The shape deformation encoding device according to claim 1,
wherein a number of said plurality of control points and said physical model structure are same for all said plurality of small areas,
said external force is calculated as an external force required to deform said plurality of small areas from before to after said shape change independently based on said physical model structure of each of said plurality of small areas, and
a number of said plurality of control points and said physical model structure are same for all said plurality of small areas.

7. The shape deformation encoding device according to claim 1,
wherein said object includes a human face, said shape of an object before shape change represents an expressionless status of a face, and said shape of an object after shape change represents an expressive status of a face.

8. A shape deformation decoding device comprising:
a decoding unit configured to determine a movement position of a control point within an action area based on a pre-deformation shape data representing a shape of an object before shape change and information of an external force acted to said action area correlated with a shape change, wherein said action area includes a plurality of small areas, and a movement position of said action point of each of said plurality of small areas is determined by using a physical model by a unit of said plurality of small areas; and a shape generation unit configured to generate a post-deformation shape data which represents a shape of said object after said shape change from said pre-deformation shape data and a movement position of each of said plurality of control points.

9. The shape deformation decoding device according to claim 8, wherein said shape generation unit generates a shape of said object after said shape change by a unit of said plurality of small areas from said pre-deformation shape data and a movement position of each of said plurality of control points, and further comprising:

an adjacent small areas adjustment unit configured to smooth a discontinuous portion occurring at a boundary part of adjacent ones of said plurality of small areas after said shape change.

10. The shape deformation decoding device according to claim 9, wherein said pre-deformation shape data is three-dimensional data, and said decoding unit includes:

a model data generation unit generating pre-deformation shape model data based on a three-dimensional model of a shape of said object before said shape change and said pre-deformation shape data; and a movement amount calculation unit determining a movement position of each of control points within said action area from said pre-deformation shape model data based on said information of an external force.

11. The shape deformation decoding device according to claim 9, wherein said pre-deformation shape data is three-dimensional data, and said decoding unit includes:

a mesh model data generation unit generating a pre-deformation shape mesh model data based on a three dimensional polygon mesh model and said pre-deformation shape data; and a movement amount calculation unit deciding a movement position of each of control points within said action area from said pre-deformation shape mesh model data based on said information of an external force.

12. The shape deformation decoding device according to claim 9, further comprising:

an action interpolation unit calculating a movement position of non-control point which is not the control point from a movement point of said control point adjacent to said non-control point for each of said plurality of small areas.

13. The shape deformation decoding device according to claim 8, further comprising:

a non-action area adjustment unit configured to smooth a discontinuous portion occurring at a boundary part between said action area and a surrounding non-action area after said shape change.

14. The shape deformation decoding device according to claim 8, wherein said plurality of control points are connected by a spring and a damper in a physical model of each of said plurality of small areas.

15. The shape deformation decoding device according to claim 8, wherein said object includes a human face, said shape before shape change represents an expressionless face, and said shape after shape change represents an expressive face.

16. The shape deformation decoding device according to claim 8, further comprising: a three-dimensional actuator group driving said action area of said object having flexibility based on said post-deformation shape data.

17. A shape deformation encoding-decoding device comprising:

a shape deformation encoding device comprising a calculation unit configured to calculate a difference data between a pre-deformation shape data which represents a shape of an object before shape change and a post-deformation shape data which represents a shape of an object after shape change;

and a determination unit configured to determine an action area on which said shape change of said object is arisen and an external force which is acted to said action area for said shape change, based on said pre-deformation shape data and said difference data;

a shape deformation encoding device comprising a decoding unit configured to determine a movement position of a control point within an action area based on a pre-deformation shape data representing a shape of an object before shape change and information of an external force acted to said action area correlated with a shape change, wherein said action area includes a plurality of small areas, and a movement position of said action point of each of said plurality of small areas is determined by using a physical model by a unit of said plurality of small areas;

and a shape generation unit configured to generate a post-deformation shape data which represents a shape of said object after said shape change from said pre-deformation shape data and a movement position of each of said plurality of control points;

and a transmission device configured to transmit said action area generated by said shape deformation encoding device and said information of an external force to said shape deformation decoding device through a communication path.

18. A shape deformation encoding method comprising the steps of:

calculating a difference data between a pre-deformation shape data which represents a shape of an object before shape change and a post-deformation shape data which represents a shape of an object after shape change; and determining an action area on which said shape change of said object is arisen and an external force which is acted to said action area for said shape change, based on said pre-deformation shape data and said difference data.

19. The shape deformation encoding method according to claim 18, wherein said action area includes a plurality of small areas, each of said plurality of small areas includes a plurality of control points, and a physical model structure in which said plurality of control points are connected together with springs and dampers are used as a physical model structure for obtaining said external force.

20. The shape deformation encoding method according to claim 19, wherein said calculating step includes the steps of:

transforming said pre-deformation shape data and said post-deformation shape data into a pre-deformation shape model data and post-deformation shape model data; and calculating said difference data from a difference between said pre-deformation shape model data and said post-deformation shape model data.

21. The shape deformation encoding method according to claim 20, wherein said model is a three-dimensional polygon mesh model, and said pre-deformation shape data and said post-deformation shape data are three-dimensional data.

22. The shape deformation encoding method according to claim 18, wherein said action area includes a plurality of small areas, each of said plurality of small areas includes a plurality of control points, and said external force is calculated as an external force required to deform said plurality of small areas from before to after said shape change independently based on a physical model structure of each of said plurality of small areas.

23. The shape deformation encoding method according to claim 18, wherein said action area includes a plurality of small areas, each of said plurality of small areas includes a plurality of control points, and said external force is calculated as an external force required to deform said plurality of small areas from before to after said shape change independently based on a physical model structure of each of said plurality of small areas, and a number of said plurality of control points and said physical model structure are same for all said plurality of small areas.

24. The shape deformation encoding method according to claim 18, wherein said object includes a human face, said shape of an object before shape change represents an expressionless status of a face, and said shape of an object after shape change represents an expressive status of a face.

25. A shape deformation decoding method comprising the steps of:

determining a movement position of a control point within an action area based on a pre-deformation shape data representing a shape of an object before shape change and information of an external force acted to said action area correlated with a shape change, wherein said action area includes a plurality of small areas, and a movement position of said action point of each of said plurality of small areas is determined by using a physical model by a unit of said plurality of small areas; and generating a post-deformation shape data which represents a shape of said object after said shape change from said pre-deformation shape data and a movement position of each of said plurality of control points.

26. The shape deformation decoding method according to claim 25, wherein said step of generating a post-deformation shape data generates a shape of said object after said shape change by a unit of said plurality of small areas from said pre-deformation shape data and a movement position of each of said plurality of control points, and further comprising the step of:

smoothing a discontinuous portion occurring at a boundary part of adjacent ones of said plurality of small areas after said shape change.

27. The shape deformation decoding method according to claim 26, wherein said pre-deformation shape data is three-dimensional data, and said step of determining a movement position includes the steps of:

generating pre-deformation shape model data based on a three-dimensional model of a shape of said object before said shape change and said pre-deformation shape data; and determining a movement position of each of control points within said action area from said pre-deformation shape model data based on said information of an external force.

28. The shape deformation decoding method according to claim 26, wherein said pre-deformation shape data is three-dimensional data, and said step of determining a movement position includes the steps of:

generating a pre-deformation shape mesh model data based on a three dimensional polygon mesh model and said pre-deformation shape data; and deciding a movement position of each of control points within said action area from said pre-deformation shape mesh model data based on said information of an external force.

29. The shape deformation decoding method according to claim 26, further comprising the step of:

calculating a movement position of non-control point which is not the control point from a movement point of said control point adjacent to said non-control point for each of said plurality of small areas.

30. The shape deformation decoding method according to claim 25, wherein said step of generating a post-deformation shape data generates a shape of said object after said shape change by a unit of said plurality of small areas from said pre-deformation shape data and a movement position of each of said plurality of control points, and further comprising the step of:

smoothing a discontinuous portion occurring at a boundary part between said action area and a surrounding non-action area after said shape change.

31. The shape deformation decoding method according to claim 25, wherein said plurality of control points are connected by a spring and a damper in a physical model of each of said plurality of small areas.

32. The shape deformation decoding method according to claim 25, wherein said object includes a human face, said shape before shape change represents an expressionless face, and said shape after shape change represents an expressive face.

33. The shape deformation decoding method according to claim 25, wherein said object is a robot, and further comprising the step of:

driving said action area of said object having flexibility based on said post-deformation shape data.

34. A shape deformation encoding-decoding method comprising the steps of:

generating information of an action area and information of an external force by calculating a difference data between a pre-deformation shape data which represents a shape of an object before shape change and a post-deformation shape data which represents a shape of an object after shave change, and determining an action area on which said shape change of said object is arisen and an external force which is acted to said action area for said shape change, based on said pre-deformation shape data and said difference data;

transmitting said information of an action area and said information of an external force through a communication path; and generating post-deformation shape data representing a shape of said object from said transmitted information of an action area and said transmitted information of an external force by the method according to claim 25.

35. A software product embodied on a computer-readable medium and comprising code that, when executed, causes a computer to perform a shape deformation encoding method including the following steps of:

calculating a difference data between a pre-deformation shape data which represents a shape of an object before shape change and a post-deformation shape data which represents a shape of an object after shape change; and determining an action area on which said shape change of said object is arisen and an external force which is acted to said action area for said shape change, based on said pre-deformation shape data and said difference data.

36. The software product according to claim 35, wherein said action area includes a plurality of small areas, each of said plurality of small areas includes a plurality of control points, and a physical model structure in which said plurality of control points are connected together with springs and dampers is used as a physical model structure for determining said external force.

37. The software product according to claim 36, wherein said step of calculating includes the steps of:

transforming said pre-deformation shape data and said post-deformation shape data into pre-deformation shape model data and post-deformation shape model data based on a three-dimensional model; and calculating said difference data from a difference between said pre-deformation shape model data and said post-deformation shape model data.

38. The software product according to claim 37, wherein said model is a three-dimensional polygon mesh model, and said pre-deformation shape data and said post-deformation shape data are three-dimensional data.

39. The software product according to claim 36, wherein said action area includes a plurality of small areas, each of said plurality of small areas includes a plurality of control points, and said external force is calculated as an external force required to deform said plurality of small areas from before to after said shape change independently based on a physical model structure of each of said plurality of small areas.

40. The software product according to claim 35, wherein said action area includes a plurality of small areas, each of said plurality of small areas includes a plurality of control points, said physical model structure in which said plurality of control points are connected together with springs and dampers are used as a physical model structure, and a number of said plurality of control points and said physical model structure are same for all said plurality of small areas.

41. The software product according to claim 35, wherein said object includes a human face, said shape of an object before shape change represents an expressionless status of a face, and said shape of an object after shape change represents an expressive status of a face.

42. A software product embodied on a computer readable medium and comprising code that, when executed, causes a computer to perform a shape deformation decoding method including the following steps of:

determining a movement position of a control point within an action area based on a pre-deformation shape data representing a shape of an object before shape change and information of an external force acted to said action area correlated with a shape change, wherein said action area includes a plurality of small areas, and a movement position of said action point of each of said plurality of small areas is determined by using a physical model by a unit of said plurality of small areas; and generating a post-deformation shape data which represents a shape of said object after said shape change from said pre-deformation shape data and a movement position of each of said plurality of control points, wherein said plurality of control points are connected to each other through a spring and a damper at a physical model of each of said plurality of small areas.

43. The software product according to claim 42, wherein said pre-deformation shape data is three-dimensional data, and said step of determining a movement position includes the steps of:

generating pre-deformation shape model data based on a three-dimensional model of a shape of said object before said shape change and said pre-deformation shape data; and determining a movement position of each of control points within said action area from said pre-deformation shape model data based on said information of an external force.

44. The software product according to claim 42, wherein said pre-deformation shape data is three-dimensional data, and said step of determining a movement position includes the steps of:

generating a pre-deformation shape mesh model data based on a three dimensional polygon mesh model and said pre-deformation shape data; and deciding a movement position of each of control points within said action area from said pre-deformation shape mesh model data based on said information of an external force.

45. The software product according to claim 42, the method further comprises the step of:

calculating a movement position of non-control point which is not the control point from a movement point of said control point adjacent to said non-control point for each of said plurality of small areas.

46. The software product according to claim 42, wherein said step of generating a post-deformation shape data generates a shape of said object after said shape change by a unit of said plurality of small areas from said pre-deformation shape data and a movement position of each of said plurality of control points.

47. The software product according to claim 42, the method further comprises the step of:

smoothing a discontinuous portion occurring at a boundary part of adjacent ones of said plurality of small areas after said shape change.

48. The software product according to claim 42, the method further comprises the step of:

smoothing a discontinuous portion occurring at a boundary part between said action area and a surrounding non-action area after said shape change.

49. The software product according to claim 42, wherein said object includes a human face, said shape before shape change represents an expressionless face, and said shape after shape change represents an expressive face.

50. The software product according to claim 42, wherein said object is a robot, and the method further comprises the step of:

driving said action area of said object having flexibility based on said post-deformation shape data.

* * * * *